United States Patent
Walser et al.

(10) Patent No.: US 8,348,328 B2
(45) Date of Patent: Jan. 8, 2013

(54) SEALING HINGE FOR A RIGID TONNEAU COVER

(75) Inventors: Thomas Dean Walser, Chesaning, MI (US); Michael Williamson, Corunna, MI (US); Louis Simko, Flushing, MI (US); Scott A. Williamson, Orlando, FL (US)

(73) Assignee: Rugged Liner, Owosso, MI (US)

( * ) Notice: Subject to any disclaimer, the term of this patent is extended or adjusted under 35 U.S.C. 154(b) by 133 days.

(21) Appl. No.: 12/610,586

(22) Filed: Nov. 2, 2009

(65) Prior Publication Data
US 2010/0109372 A1    May 6, 2010

Related U.S. Application Data

(60) Provisional application No. 61/110,379, filed on Oct. 31, 2008.

(51) Int. Cl.
*B60P 7/02* (2006.01)
(52) U.S. Cl. .................................. 296/100.09
(58) Field of Classification Search ............. 296/100.01, 296/100.02, 100.06, 100.07, 100.09; 49/475.1, 49/484.1, 489.1; 16/387
See application file for complete search history.

(56) References Cited

U.S. PATENT DOCUMENTS

| | | | |
|---|---|---|---|
| 4,844,531 A | 7/1989 | Kooiker | |
| 4,946,217 A | 8/1990 | Steffens et al. | |
| 5,427,428 A | 6/1995 | Ericson et al. | |
| 5,636,893 A | 6/1997 | Wheatley et al. | |
| 5,653,491 A | 8/1997 | Steffens et al. | |
| 6,059,350 A | 5/2000 | Kooiker | |
| 6,352,296 B1 | 3/2002 | Kooiker | |
| 6,422,635 B1 * | 7/2002 | Steffens et al. | 296/100.09 |
| 6,565,141 B1 * | 5/2003 | Steffens et al. | 296/100.07 |
| 6,827,389 B1 * | 12/2004 | Pandorf | 296/100.02 |
| 7,484,788 B2 * | 2/2009 | Calder et al. | 296/100.09 |
| 7,537,264 B2 | 5/2009 | Maimin et al. | |
| 2001/0035664 A1 * | 11/2001 | Steffens et al. | 296/100.09 |
| 2005/0099033 A1 * | 5/2005 | Chverchko et al. | 296/100.09 |
| 2007/0052257 A1 * | 3/2007 | Allen | 296/100.09 |
| 2007/0210609 A1 * | 9/2007 | Maimin et al. | 296/100.09 |
| 2008/0100088 A1 * | 5/2008 | Calder et al. | 296/100.09 |

* cited by examiner

*Primary Examiner* — H Gutman
(74) *Attorney, Agent, or Firm* — Howard & Howard Attorneys PLLC

(57) ABSTRACT

A folding tonneau cover including a first substantially rigid panel having a laterally-extending front edge at least partially defined by an elongate edge rail, and a second substantially rigid panel having a laterally-extending rear edge at least partially defined by an elongate edge rail, the first and second panels having opposed exterior and interior sides. The first and second panels substantially lie in a plane when the cover is unfolded, the first and second panel exterior sides generally facing in a direction away from a first side of the plane when the cover is unfolded, the first and second panel exterior sides adjacently superposed when the cover is folded. The cover includes a hinge assembly having substantially rigid first and second portions pivotally connected together along a first pivot axis located on the one side of the plane, the hinge first portion affixed to the first panel edge rail, the hinge second portion affixed to the second panel edge rail. A seal is affixed to at least one of the first and second panel edge rails. When the cover is unfolded the seal extends from one of the first panel front edge and the second panel rear edge toward the other and is entirely disposed on the same side of the first pivot axis as is the plane.

20 Claims, 25 Drawing Sheets

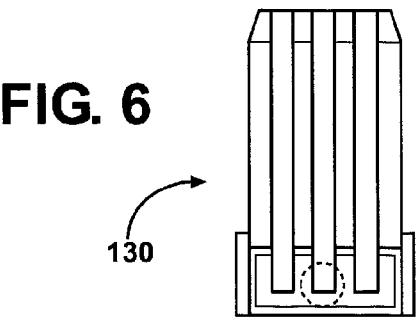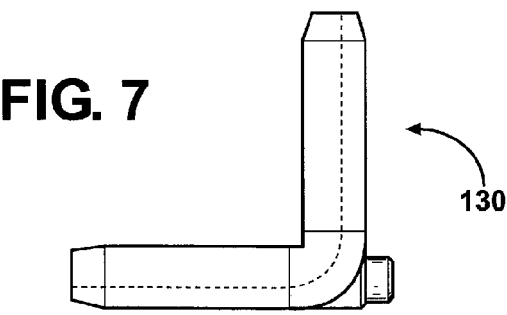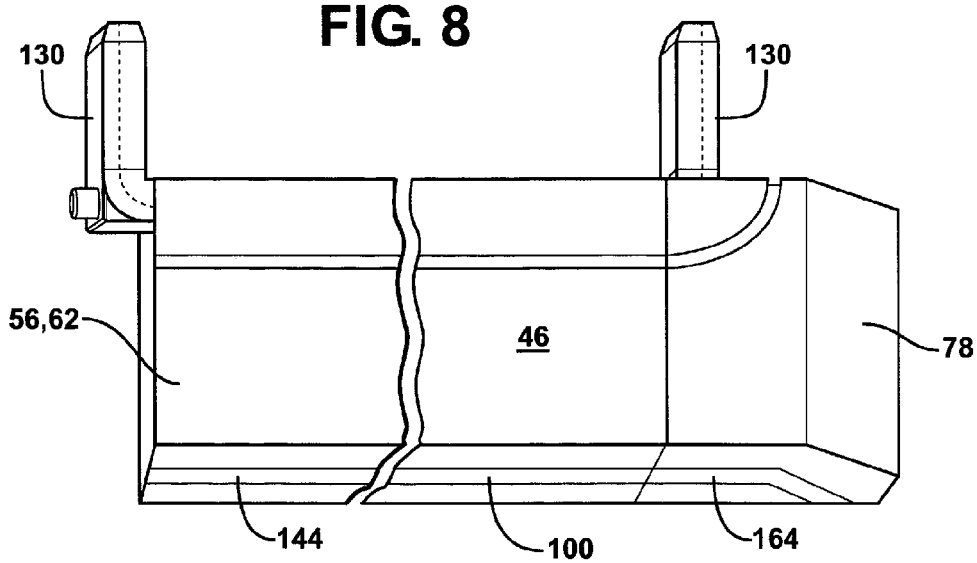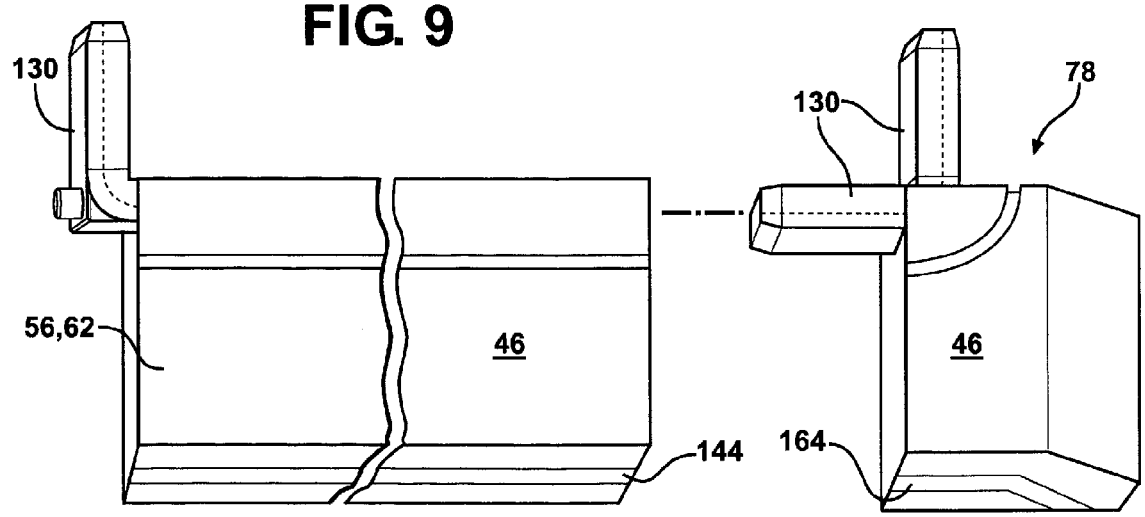

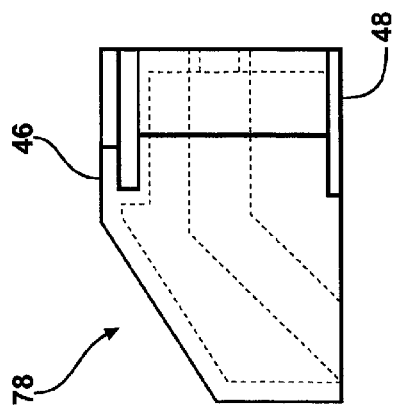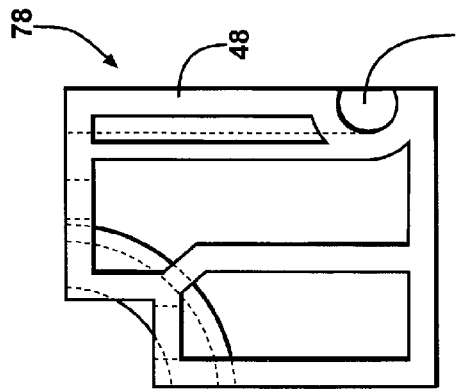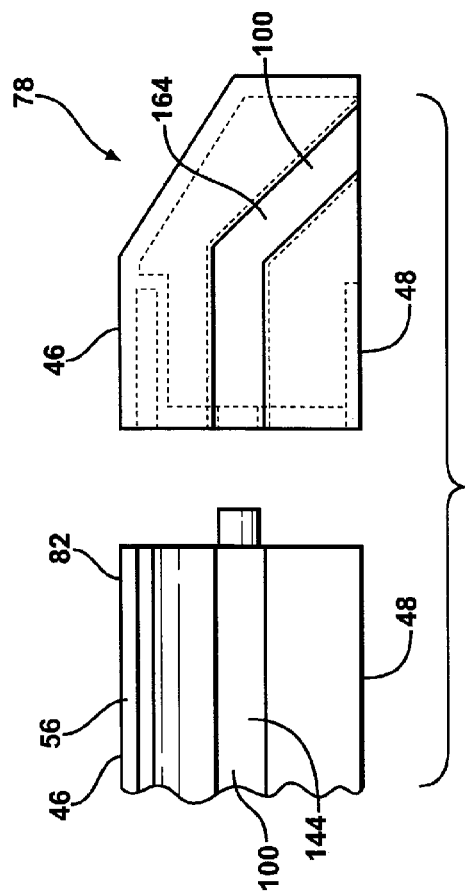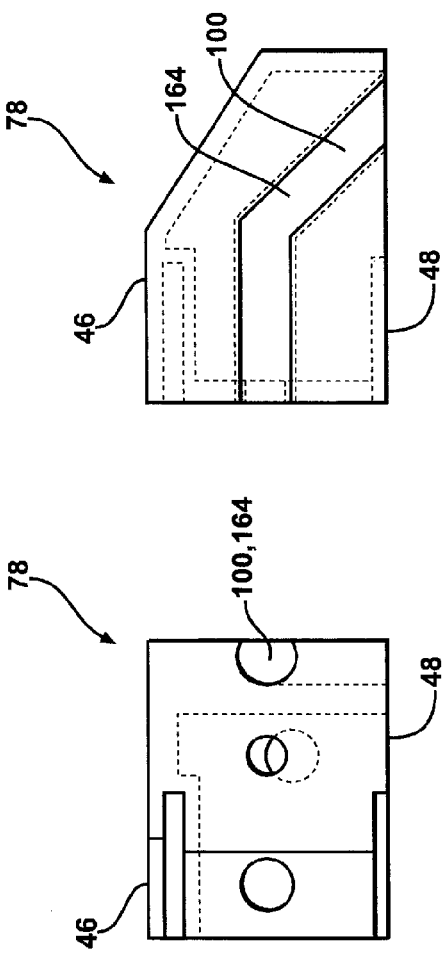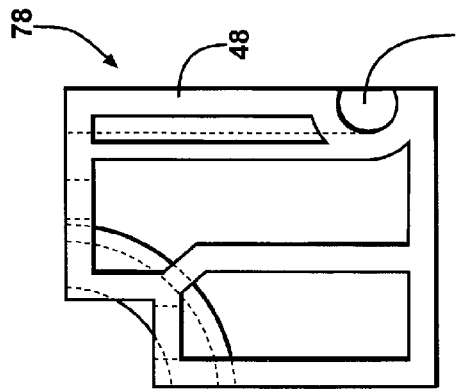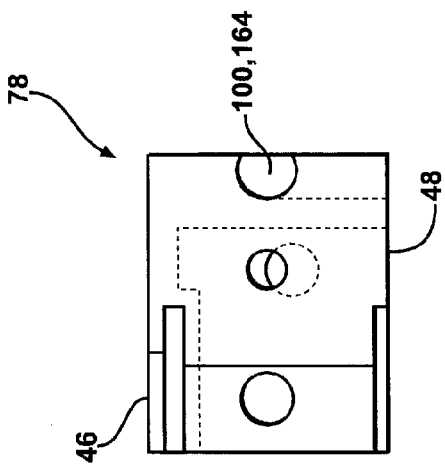

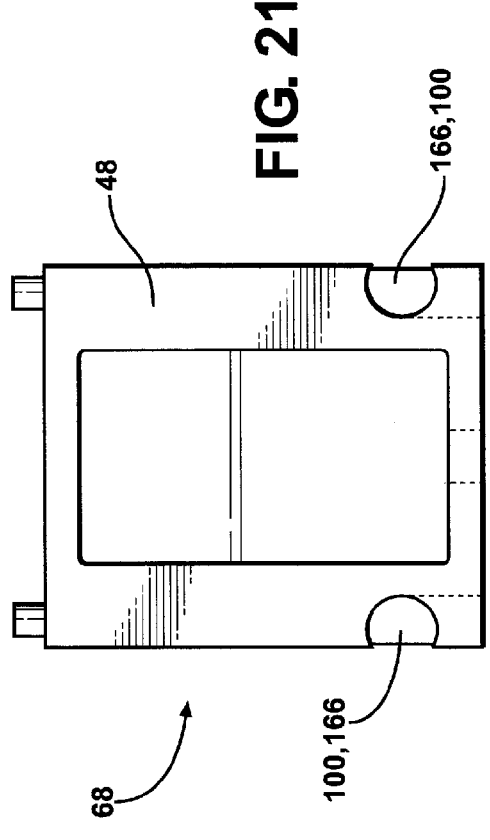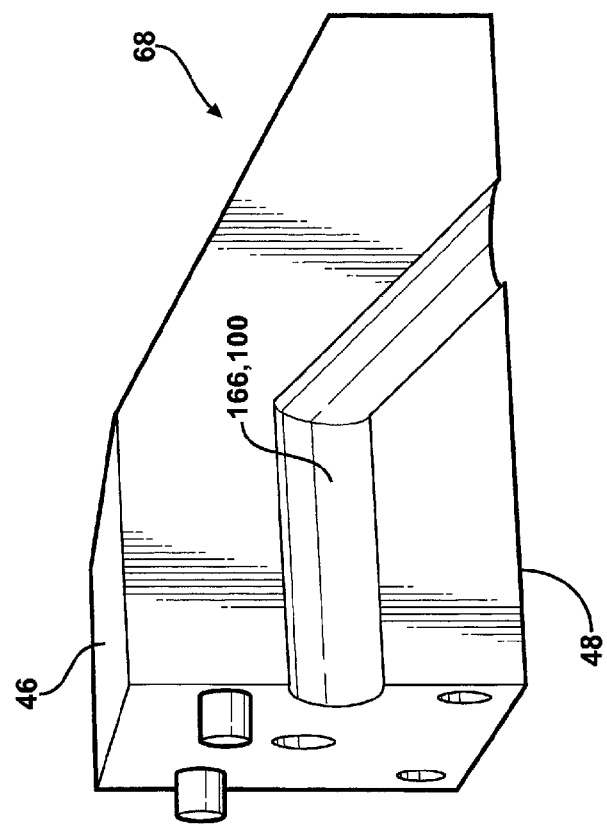

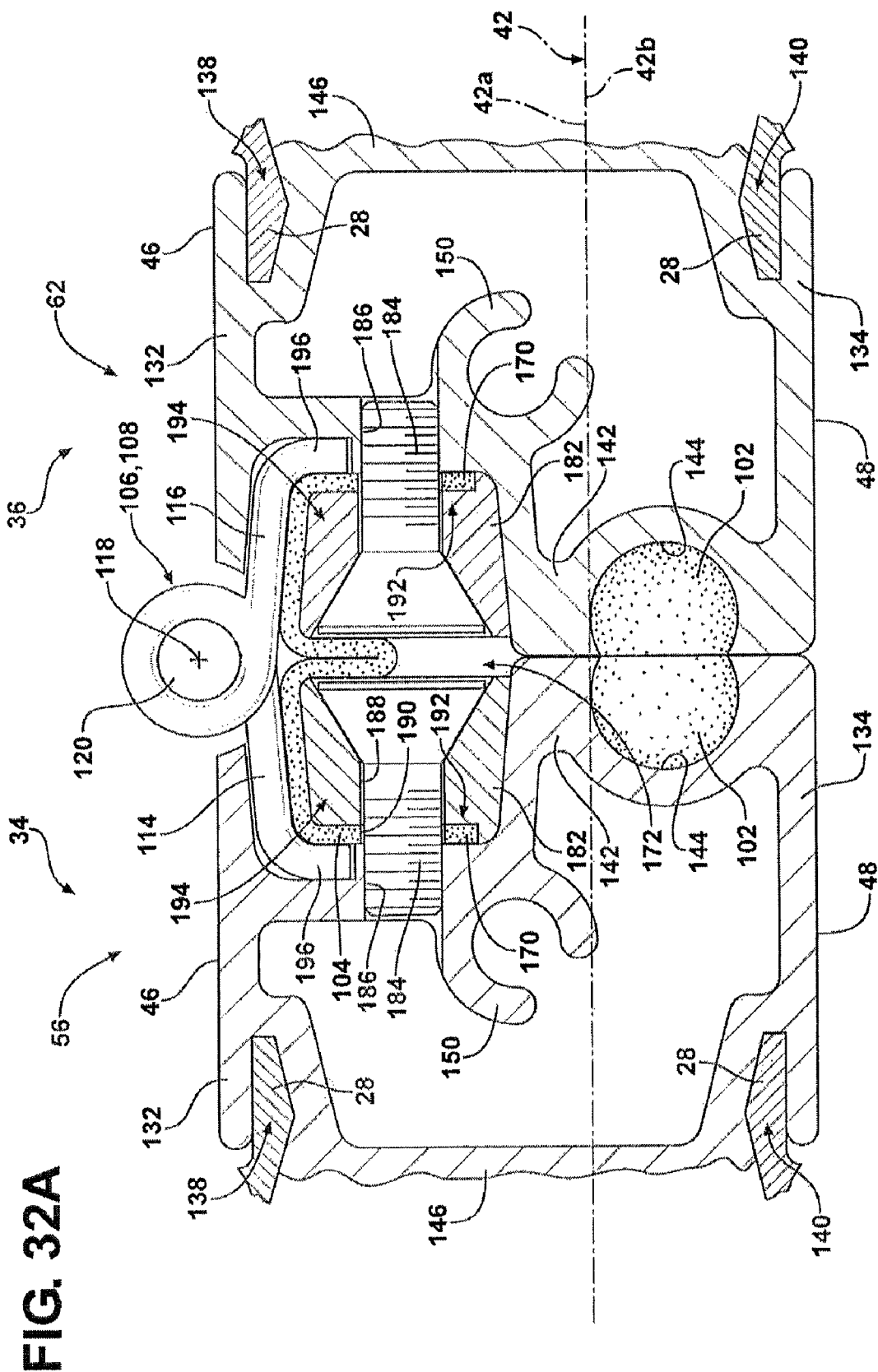

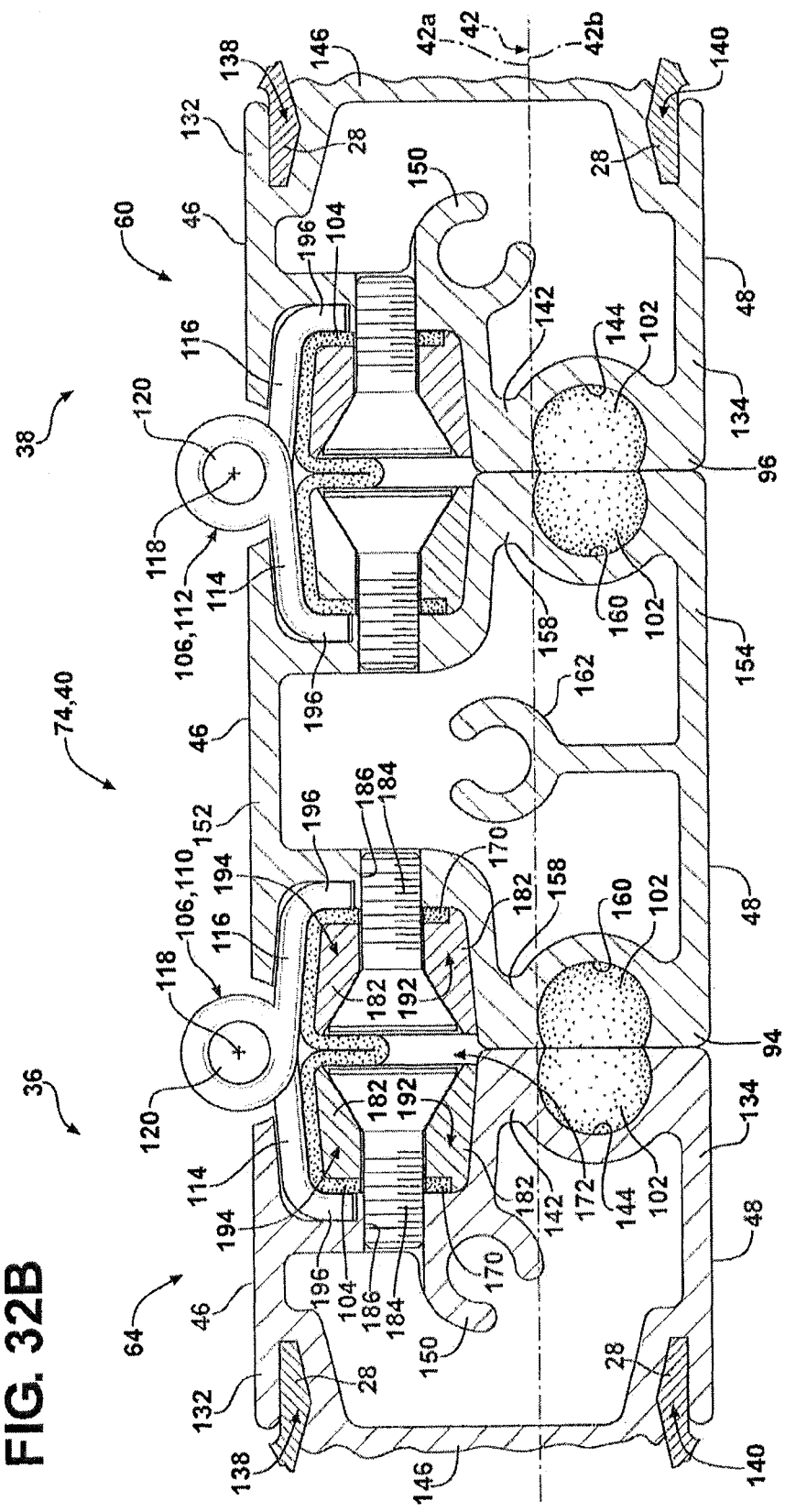

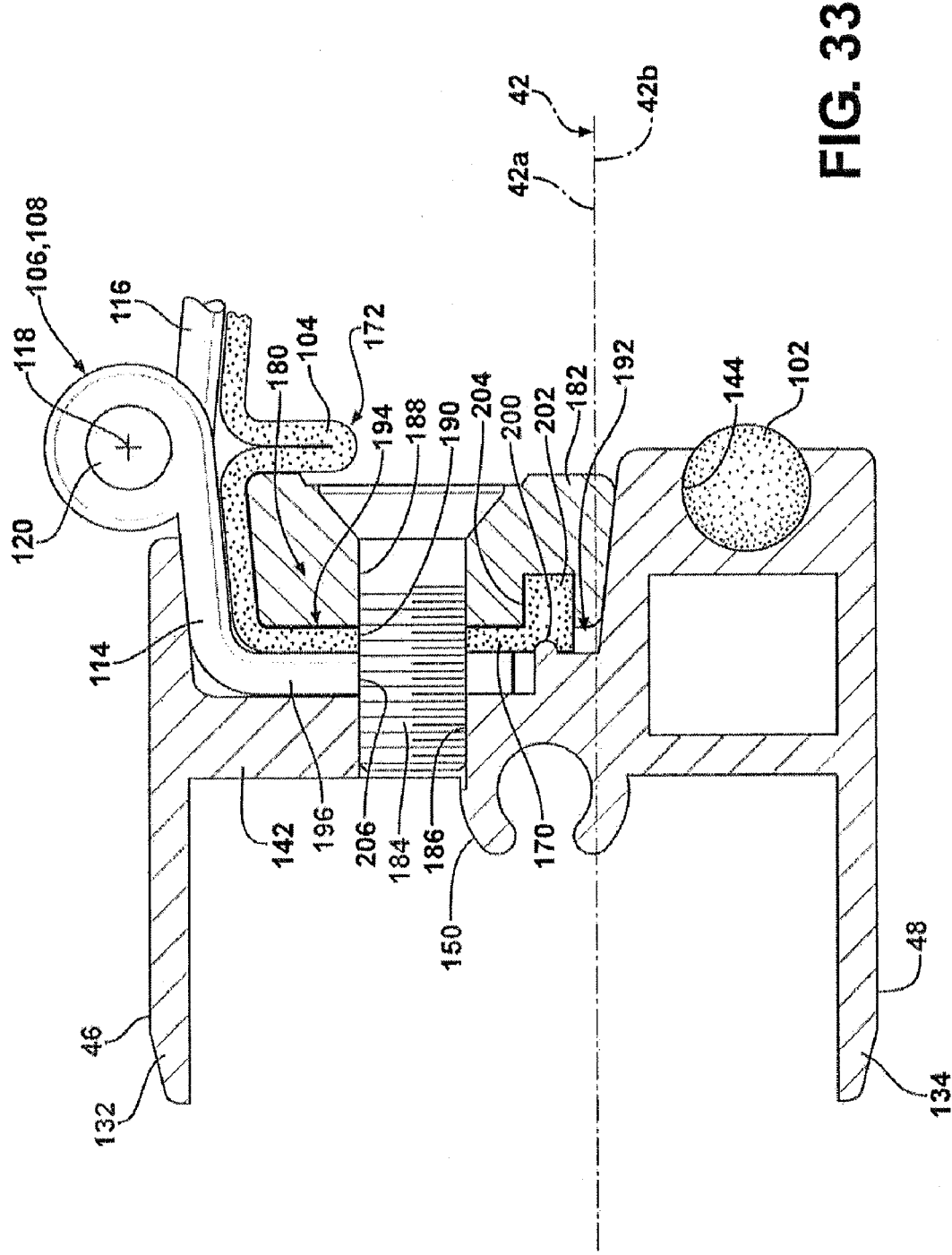

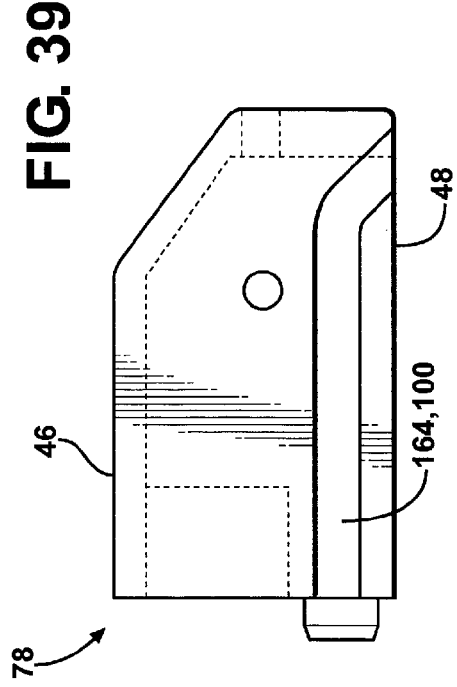
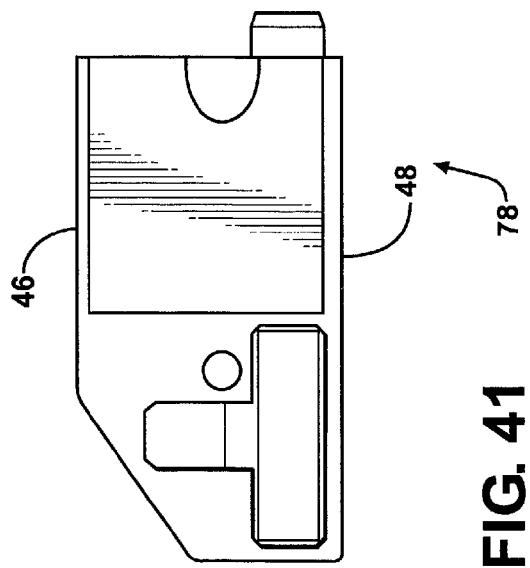
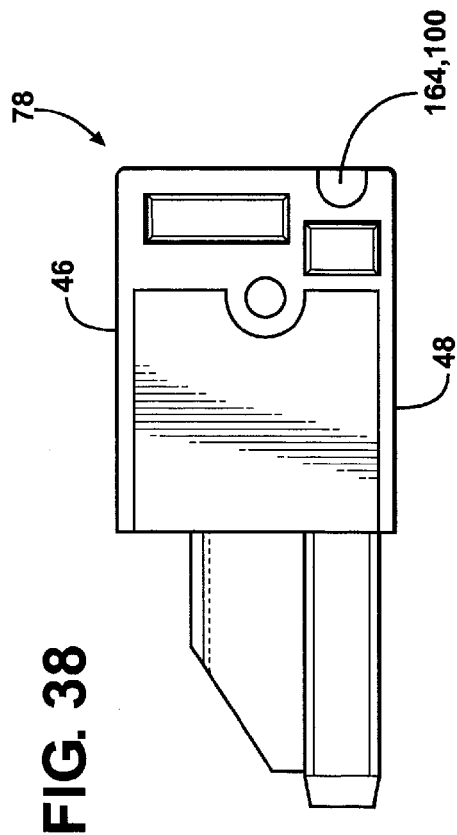
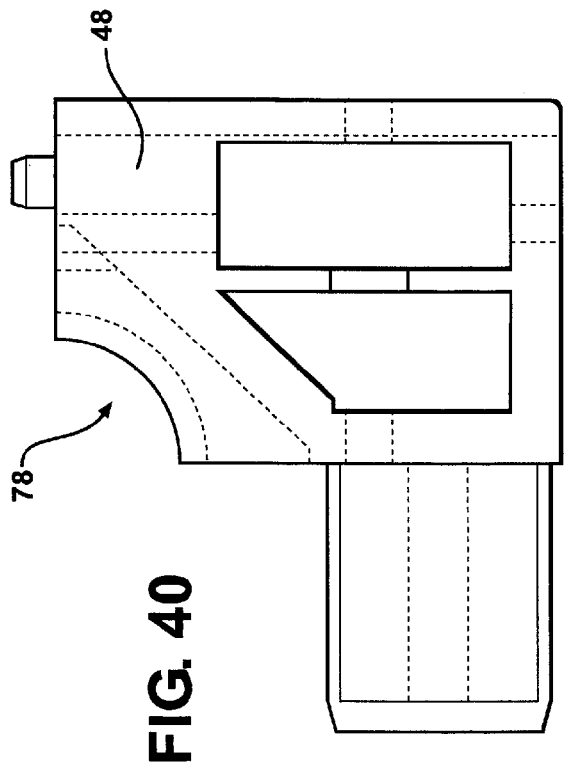

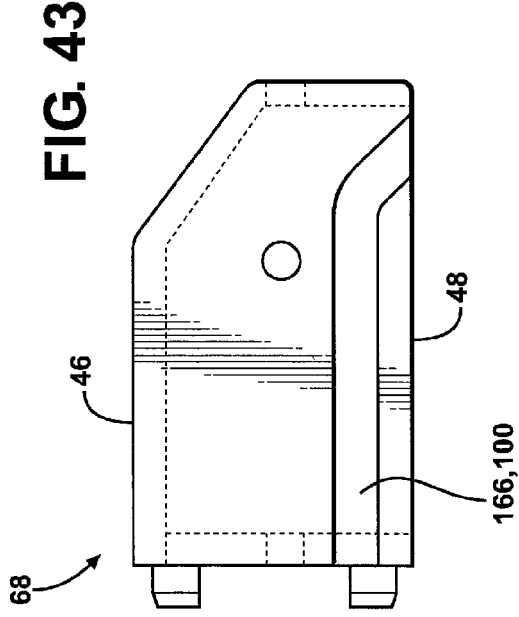
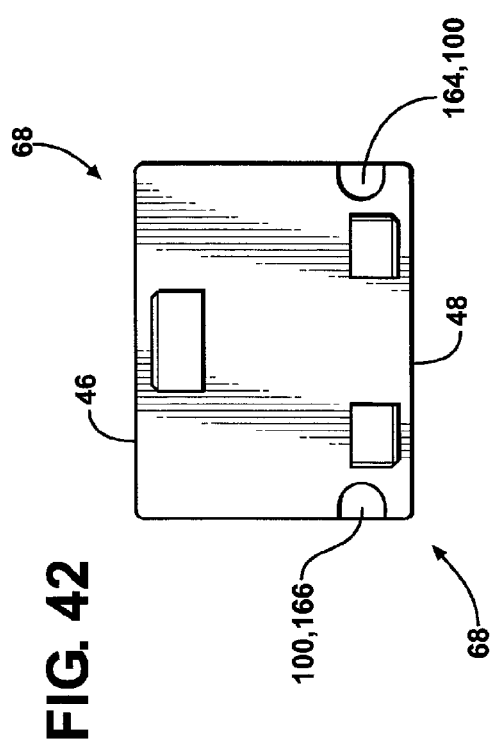
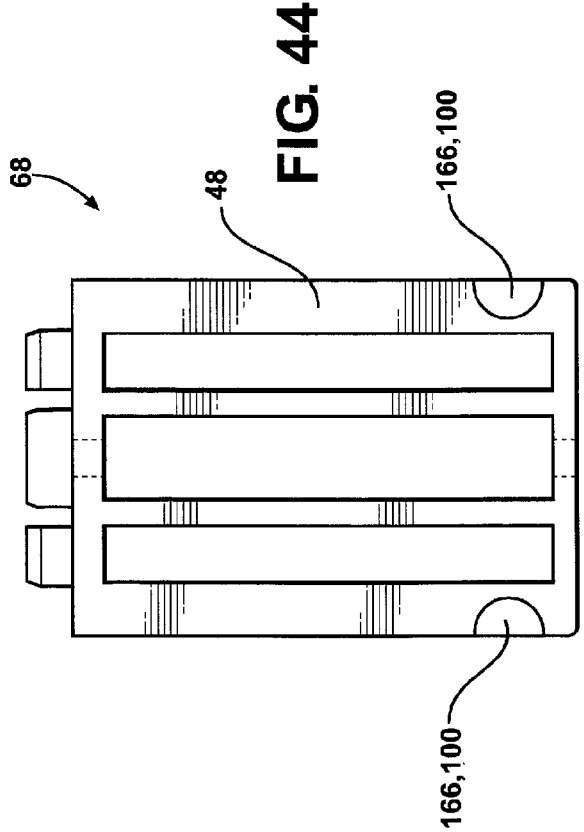

SEALING HINGE FOR A RIGID TONNEAU COVER

CROSS-REFERENCE TO RELATED APPLICATION

This application claims the benefit of U.S. Provisional Patent Application Ser. No. 61/110,379 for a SEALING HINGE FOR A RIGID TONNEAU COVER, filed on Oct. 31, 2008, which is hereby incorporated by reference in its entirety.

TECHNICAL FIELD

The subject invention relates to a rigid tonneau cover for covering the cargo area of a vehicle and more specifically to a hinge for folding rigid panels of the tonneau cover to better weatherproof the interior of the cargo area when the tonneau cover is unfolded, particularly against the ingress of water.

SUMMARY OF THE INVENTION

The present invention provides a folding tonneau cover including a first substantially rigid panel having a laterally-extending front edge at least partially defined by an elongate edge rail, and a second substantially rigid panel having a laterally-extending rear edge at least partially defined by an elongate edge rail, the first and second panels having opposed exterior and interior sides. The first and second panels substantially lie in a plane when the cover is unfolded, the first and second panel exterior sides generally facing in a direction away from a first side of the plane when the cover is unfolded, the first and second panel exterior sides adjacently superposed when the cover is folded. The cover includes a hinge assembly having substantially rigid first and second portions pivotally connected together along a first pivot axis located on the one side of the plane, the hinge first portion affixed to the first panel edge rail, the hinge second portion affixed to the second panel edge rail. A seal is affixed to at least one of the first and second panel edge rails. When the cover is unfolded the seal extends from one of the first panel front edge and the second panel rear edge toward the other and is entirely disposed on the same side of the first pivot axis as is the plane.

The invention also provides a folding tonneau cover including a first substantially rigid panel having a laterally-extending front edge, and a second substantially rigid panel having a laterally-extending rear edge substantially parallel and adjacent to the first panel front edge, and a laterally-extending front edge substantially parallel with and distanced from the second panel rear edge. The cover includes a third substantially rigid panel having a laterally-extending rear edge substantially parallel with the second panel front edge, and a spacer rail having opposed, laterally-extending rear and front edges respectively parallel and adjacent to the second panel front edge and the third panel rear edge. Each panel and the spacer rail substantially lies in a plane and has an exterior side generally facing in a direction away from a first side of the plane when the cover is unfolded. The cover includes a first, second and third hinge, each having substantially rigid first and second portions pivotally connected about a respective pivot axis. Each pivot axis is located on the first side of the plane. The first hinge first and second portions are respectively affixed to the first and second panels, the second hinge first and second portions are respectively affixed to the second panel and the spacer rail, and the third hinge first and second portions are respectively affixed to the spacer rail and the third panel. The cover includes a first seal extending between the first panel front edge and the second panel rear edge when the cover is unfolded, a second seal extending between the second panel front edge and the spacer rail rear edge when the cover is unfolded, and a third seal extending between the spacer rail front edge and the third panel rear edge when the cover is unfolded. Each of the first, second and third seals is entirely disposed on the same side of the respective first, second and third hinge pivot axis as is the plane when the cover is unfolded.

BRIEF DESCRIPTION OF THE DRAWINGS

Other advantages of the present invention will be readily appreciated, as the same becomes better understood by reference to the following detailed description when considered in connection with the accompanying drawings, wherein:

FIG. 6 is an end view of a tonneau cover frame connector according to a first embodiment;

FIG. 7 is a side view of the frame connector of FIG. 6;

FIG. 8 is a fragmented upper perspective view of a partial tonneau cover panel edge rail and panel corner assembly, according to the first embodiment FIG. 9 is an exploded view of the partial assembly shown in FIG. 8;

FIG. 16 is an exploded, partially fragmented panel edge-on view of a tonneau cover panel edge rail and one of its two panel corner members, according to the first embodiment;

FIG. 17 is a view of the reverse side of the corner member shown in FIG. 16;

FIG. 18 is an edge rail-engaging end view of the corner member of FIG. 17;

FIG. 19 is a panel edge-on view of the corner member of FIG. 17, similar to the view thereof in FIG. 16;

FIG. 20 is a bottom view of the corner member of FIG. 17;

FIG. 21 is a bottom view of a tonneau cover spacer rail end cap according to the first embodiment;

FIG. 22 is a perspective view of the end cap of FIG. 21;

FIG. 32A is a fragmented, sectional end view of a connected pair of tonneau cover panel edge rails, their hinge, seals and clamp bars, and fasteners, according to a third embodiment;

FIG. 32B is a fragmented, sectional end view of a pair of tonneau cover panel edge rails and a spacer rail, their hinges, seals and clamp bars, and fasteners, according to the third embodiment;

FIG. 33 is a fragmented, sectional end view of one of a connected pair of tonneau cover panel edge rails, and its hinge, clamp bar, a fastener and one of its seals, according to a fourth embodiment;

FIG. 38 is an end view of a tonneau cover panel corner member according to the fourth embodiment;

FIG. 39 is a panel edge-on view of the corner member of FIG. 38;

FIG. 40 is a bottom view of the corner member of FIG. 38;

FIG. 41 is a side view of the corner member of FIG. 38;

FIG. 42 is an end view of a tonneau cover spacer rail end cap according to the fourth embodiment;

FIG. 43 is an edge-on view of the end cap of FIG. 42;

FIG. 44 is a bottom view of the end cap of FIG. 42;

Figure 1:
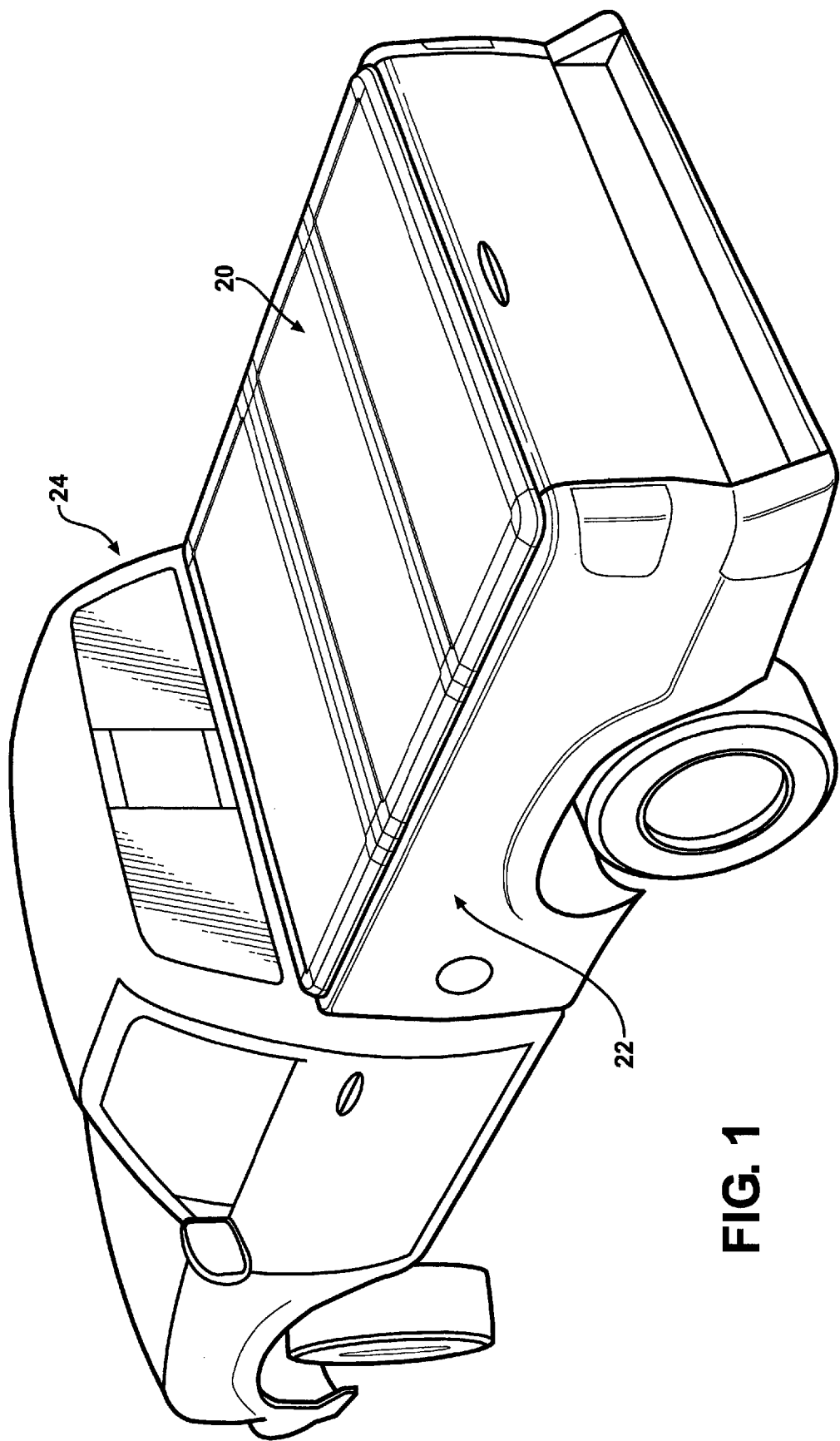
FIG. 1 is a perspective view of a tonneau cover in an unfolded condition, installed on a pick-up truck.

While the invention is susceptible to various modifications and alternative forms, specific embodiments thereof are shown by way of example in the drawings and may herein be described in detail. It should be understood, however, that the drawings and detailed description thereto are not intended to limit the invention to a particular form disclosed, but on the contrary, the intention is to cover all modifications, equivalents and alternatives falling within the spirit and scope of the present invention as defined by the appended claims.

Moreover, it is to be noted that the Figures are not necessarily drawn to scale or to the same scale. In particular, the scale of some of the elements of the Figures may be exaggerated to emphasize characteristics of the elements. Elements shown in more than one Figure that may be similarly configured have been indicated using the same reference numerals.

DETAILED DESCRIPTION OF THE PREFERRED EMBODIMENT

Referring to the Figures, wherein like numerals indicate like or corresponding parts throughout the several views, a folding tonneau cover is generally shown at 20. The tonneau cover 20 is typically used to cover a cargo box 22 of a pick-up truck 24.

Referring generally to FIGS. 1-5, the tonneau cover 20 includes a plurality of individual panels 26. Each of the panels 26 includes a sheet member 28. It is to be appreciated that each of the panels 26 may include a plurality of sheet members 28. The sheet member 28 comprises a stiff material for providing rigidity to the tonneau cover 20 and for protecting the space within cargo box 22. A plurality of frame members 30 bound the sheet member 28 of each panel 26 and forms a substantially rectangular configuration. The frame members 30 also provide added rigidity and support to each of the panels 26. The frame members 30 may be aluminum extrusions.

The frame members 30 substantially define for each panel 26 a perimeter 32. Referring to FIGS. 1-5, the plurality of individual panels 26 includes a first or rear panel 34, a second or center panel 36, and a third or front panel 38. However, it should be appreciated that any number of panels 26 may be employed without deviating from the present invention. Disposed between the second 36 and third panels 38 of tonneau cover 20 is elongate spacer member 40. The individual panels 26 and the spacer member 40 are arranged such that, when the tonneau cover 20 is unfolded, the panels 26 and the spacer member 40 are aligned, substantially lie in a common, substantially horizontal plane 42, and define a substantially rectangular tonneau cover periphery 44 having a length and a width. The width dimension of the tonneau cover 20, which extends laterally or side-to-side, is fixed. The length dimension of the tonneau cover 20, which extends longitudinally or front-to-back (between the truck cab and tailgate ends of the cargo area), is varied with the differing states or stages of the tonneau cover 20 being unfolded and folded.

Each panel 26 and spacer member 40, and tonneau cover 20 itself, has opposed first and second sides 46, 48, which respectively face exteriorly and interiorly relative to the cargo box 22 when tonneau cover 20 is unfolded, thereby enclosing the space within cargo box 22. When cover 20 is unfolded, its first, exterior side 46 (which is comprised of the exterior sides 46 of panels 26 and spacer member 40) generally faces in the direction normally away from upper side 42a of substantially horizontal plane 42, and its second, interior side 48 (which is comprised of the interior sides 48 of panels 26 and spacer member 40) generally faces in the direction normally away from lower side 42b of substantially horizontal plane 42.

Frame members 30 of each panel 26 include a pair of parallel left 50 and right 52 side rails that extend longitudinally, and partially define the periphery 44 of cover 20. Frame 30 of first or rear panel 34 further includes laterally-extending tailgate-end frame member 54 that substantially defines the rearmost segment of the rectangular periphery 44 of the unfolded tonneau cover 20. Frame 30 of first or rear panel 34 further includes laterally-extending panel edge rail 56.

Frame 30 of third or front panel 38 further includes laterally-extending cab-end frame member 58 that substantially defines the frontmost segment of the rectangular periphery 44 of the unfolded tonneau cover 20. Frame 30 of third or front panel 38 further includes laterally-extending panel edge rail 60. Frame 30 of second or center panel 36 further includes first and second substantially parallel, laterally-extending panel edge rails 62 and 64, respectively.

Figure 2:
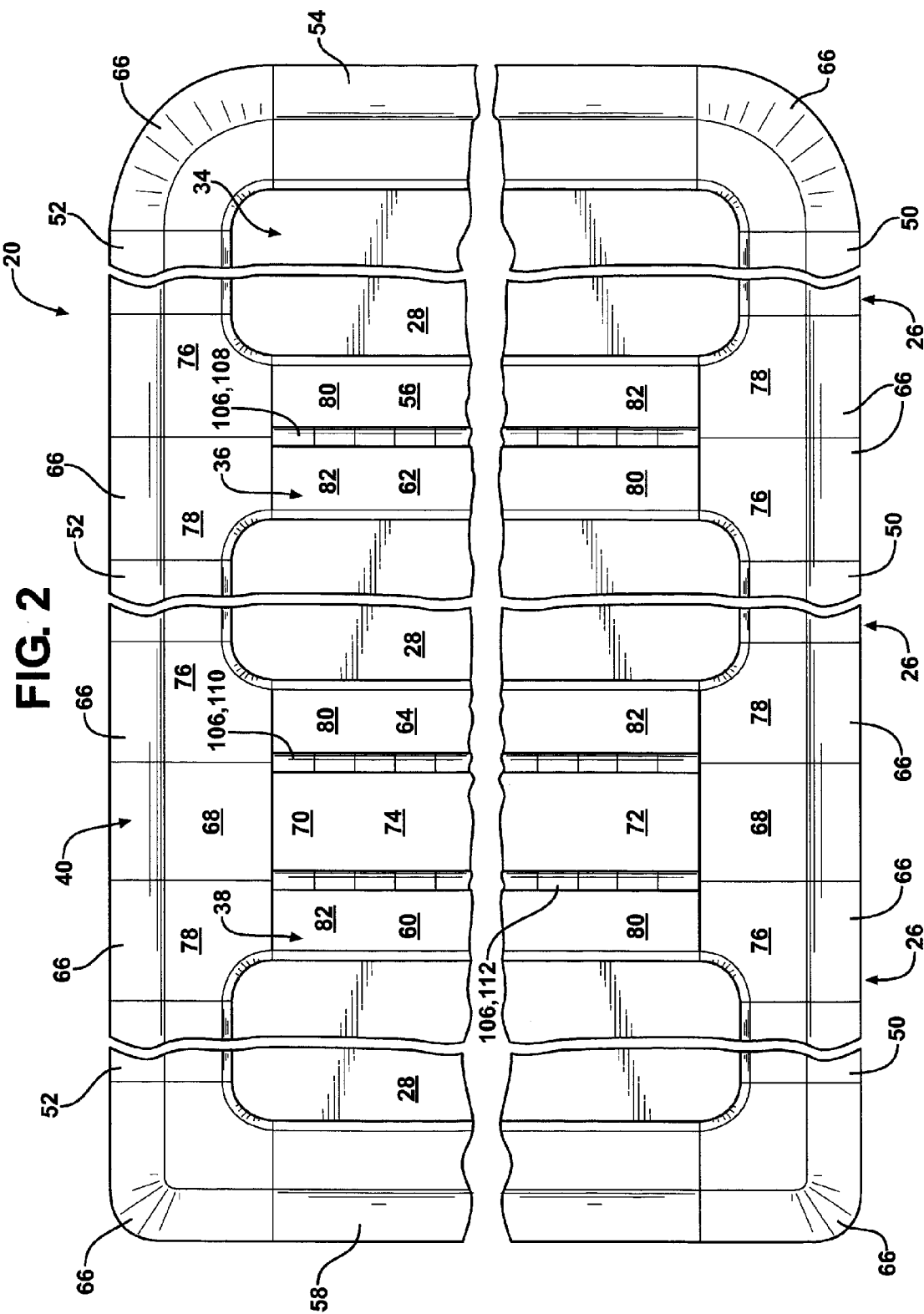
FIG. 2 is fragmented top or exterior plan view of the tonneau cover.
Figure 3:
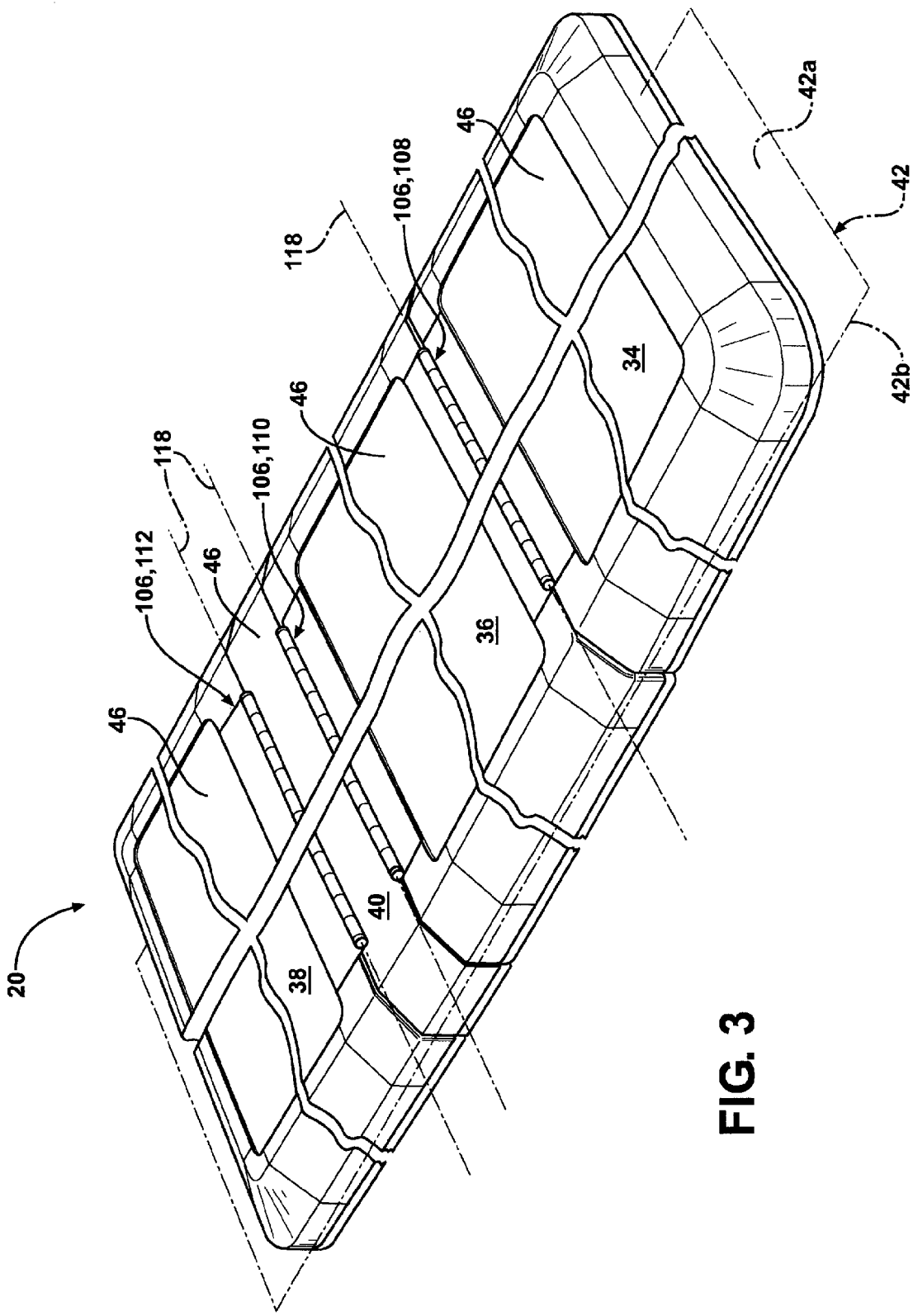
FIG. 3 is a fragmented upper or exterior perspective view of the tonneau cover in an unfolded condition.
Figure 4:
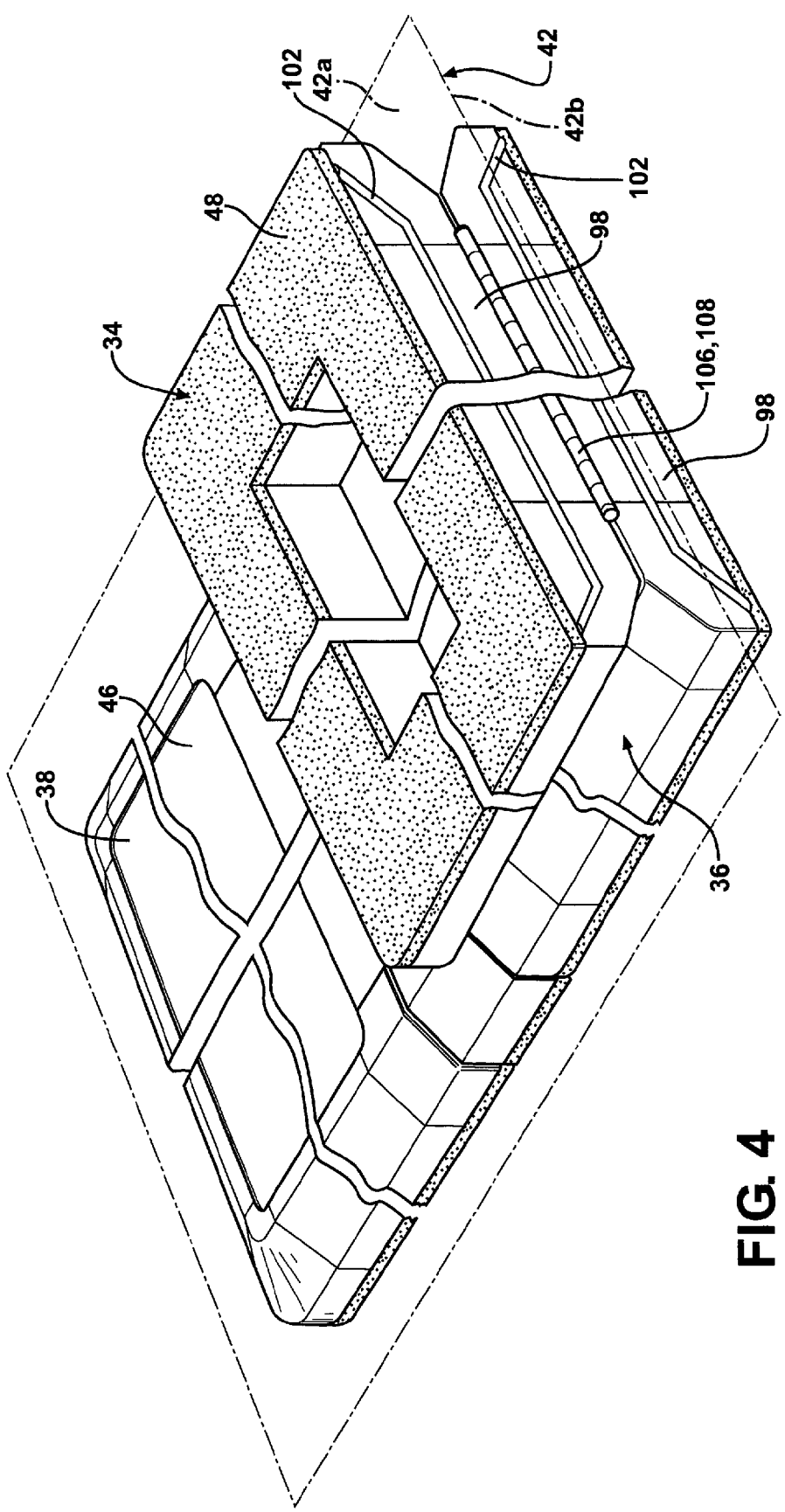
FIG. 4 is a fragmented upper or exterior perspective view of the tonneau cover in a partially folded condition with a first or rear panel folded onto a second or center panel.
Figure 5:
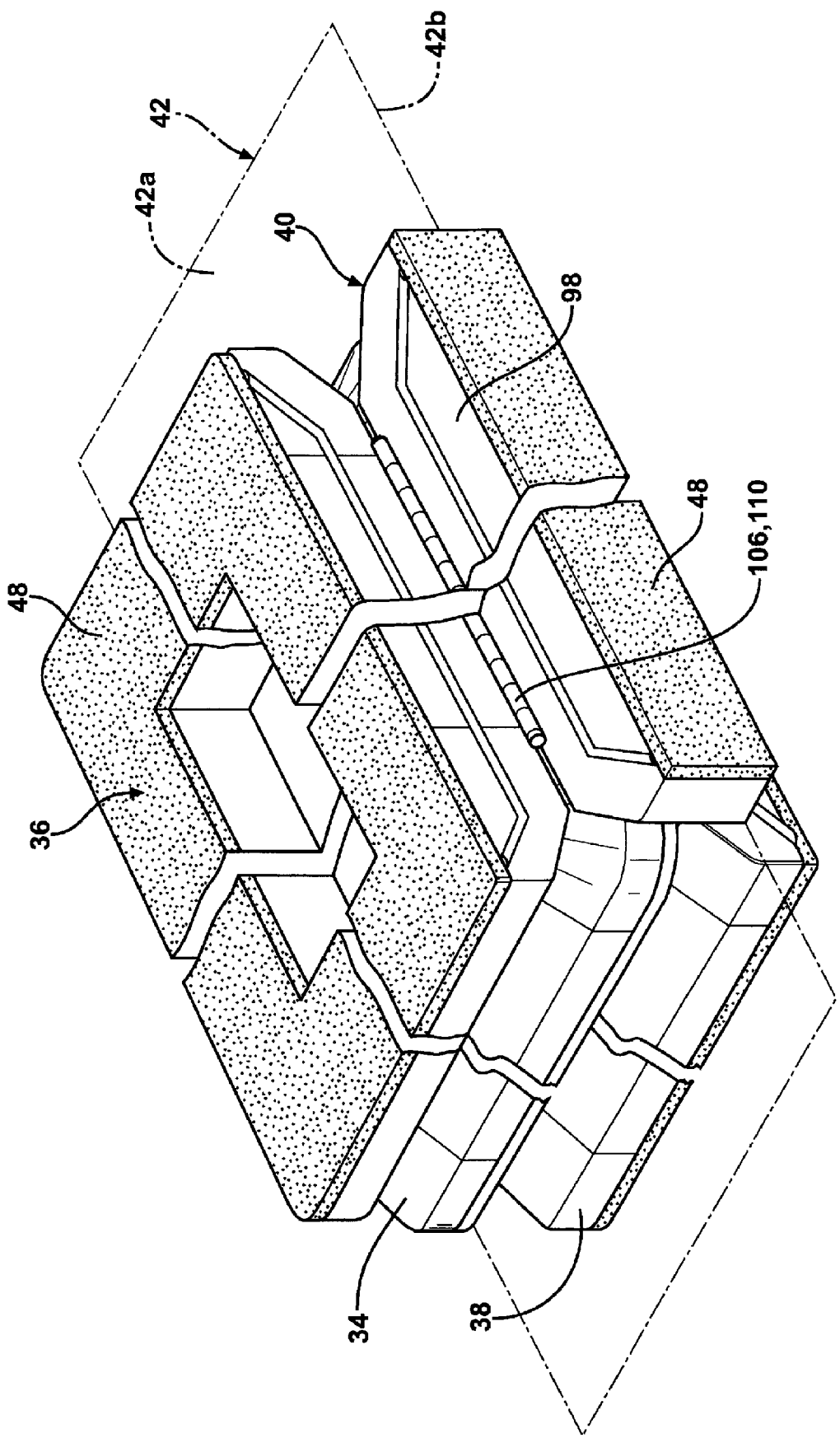
FIG. 5 is a fragmented upper or exterior perspective view of the tonneau cover in a completely folded condition, with the first or rear panel sandwiched between the second or center panel and a third or front panel.

As best shown in FIGS. 2 and 3, in each panel 26 an outer corner member 66 joins the frame members 30 to each other and partially defines the panel perimeter 32 and periphery 44 of tonneau cover 20. Spacer member 40 includes identical end caps 68 affixed to the opposite axial ends 70, 72 of elongate, laterally-extending spacer rail 74, which may be an aluminum extrusion. The laterally outermost edges of end caps 68 partially define the periphery 44 of the tonneau cover 20.

Outer corner members 66 include first 76 and second 78 panel edge corner members that are minor images of each other and are affixed to the opposed axial ends 80, 82 of identical panel edge rails 56, 60, 62, 64 to respectively define one of a plurality of panel edge members 84 that includes: panel edge member 86 of first or rear panel 34; first 88 and second 90 panel edge members of second or center panel 86; and panel edge member 92 of third or front panel 38. Spacer member 40 includes opposed rearward 94 and forward 96 facing portions. With cover 20 unfolded, the adjacently superposed, paired sealing faces 98 of: panel edge members 86 and 88; panel edge member 90 and rearward facing portion 94; and forward facing portion 96 and panel edge member 90, are respectively interfacingly aligned, with plane 42 extending therethrough.

In each of the embodiments disclosed herein, each of these paired sealing faces 98 is provided with a laterally-extending channel 100 in which is disposed an elongate compression seal or sealing member 102 which laterally extends substantially the entire width of cover 20. With cover 20 unfolded, the seal 102 affixed to each one of the pair of superposed sealing faces 98 extends towards the other. The interfacing seals 102 of each pair of superposed sealing faces 98 compressively abut each other, thereby providing a first sealing means between sealing faces 98. In its uncompressed state, seal 102 may have a substantially circular cross section, and is made of a suitable sealing material such as, for example, closed cell foam rubber.

In the second, third and fourth embodiments described further herein below, an additional, second sealing means is provided between sealing faces 98 that includes a laterally-extending seal 104 having elongate, opposed edges each attached to a respective one of the interfacing panel edge rails 56, 60, 62, 64 and spacer rail 74.

Figure 30:
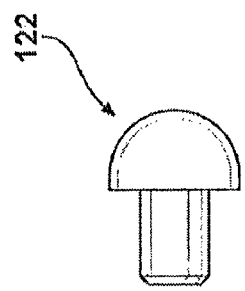
FIG. 30 is a side view of a tonneau cover hinge end plug.
Figure 28:
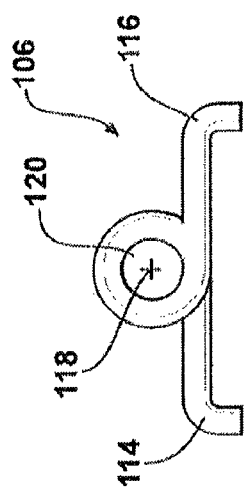
FIG. 28 is an end view of a tonneau cover hinge according to the first embodiment.

The panels 26 and the spacer member 40 are operationally coupled to each other through a plurality of hinge assemblies 106 for moving between a folded position and an unfolded position. In tonneau cover 20, the plurality of hinge assemblies 106 is further defined as a first hinge assembly 108, a second hinge assembly 110, and a third hinge assembly 112. Each hinge assembly 108, 110, 112 includes substantially rigid first and second portions 114, 116 pivotally connected about a pivot axis 118, which may be defined by a hinge pin or rod 120 linking the first and second hinge portions 114, 116. Between the various hinge assemblies 108, 110 and 112, the respective first and second portions 114 and 116 need not be identical. That is to say, the first portion 114 of one hinge assembly 106 need not be identical to the hinge assembly first portion 114 of another hinge assembly 106. The same can be said for hinge assembly second portion 116. Each hinge assembly 106 may be configured as an elongate piano hinge, well known in the art. A plug 122 (FIG. 30) may be inserted into each axial end of hinge assembly 106. In each of the embodiments of tonneau cover 20 disclosed herein, when the cover is unfolded, the seals 102 of each panel 26 and the spacer member 40, and the seals 104 that are affixed to respective, adjacent edges thereof, are entirely disposed on the same side of the respective hinge pivot axis 118 as is plane 42.

First hinge assembly 108 operationally connects rear or first panel 34 and center or second panel 36. The first portion 114 of first hinge assembly 108 is affixed to panel edge rail 56 of rear panel 34, and the second portion 116 of first hinge assembly 108 is affixed to a first panel edge rail 62 of center panel 36 such that, when folded, first side 46 of rear panel 34 adjacently superposes first side 46 of center panel 36.

Second hinge assembly 110 operationally connects center or second panel 36 and spacer member 40. The first portion 114 of second hinge assembly 110 is affixed to second panel edge rail 64 of center panel 36, and the second portion 116 of second hinge assembly 110 is affixed to rearward portion 94 of spacer rail 74.

Third hinge assembly 112 operationally connects spacer member 40 and front or third panel 38. The first portion 114 of third hinge assembly 112 is affixed to forward portion 96 of spacer rail 74, and second portion 116 of third hinge assembly 112 is affixed to panel edge rail 60 of front or third panel 38. Second 110 and third 112 hinge assemblies are positioned such that, when tonneau cover 20 is completely folded, first panel 34 is sandwiched between second panel 36 and third panel 38, with second side 48 of first panel 34 adjacently superposing first side 46 of third panel 38. When cover 20 is in its completely folded condition, spacer member 40 extends generally vertically over the thickness of first panel 34, and its second surface 48 is rearwardly exposed.

Generally, third or front panel 38 of cover 20 remains fixed in position relative to truck 24, and the center 36 and rear 34 panels are selectively fastened to the cargo box 22 of the truck to secure cover 20 when unfolded. The particular means for securing cover 20 to truck 24, which may be by a mechanism known in the art, are unrelated to the present invention and not herein discussed further.

Figure 10:
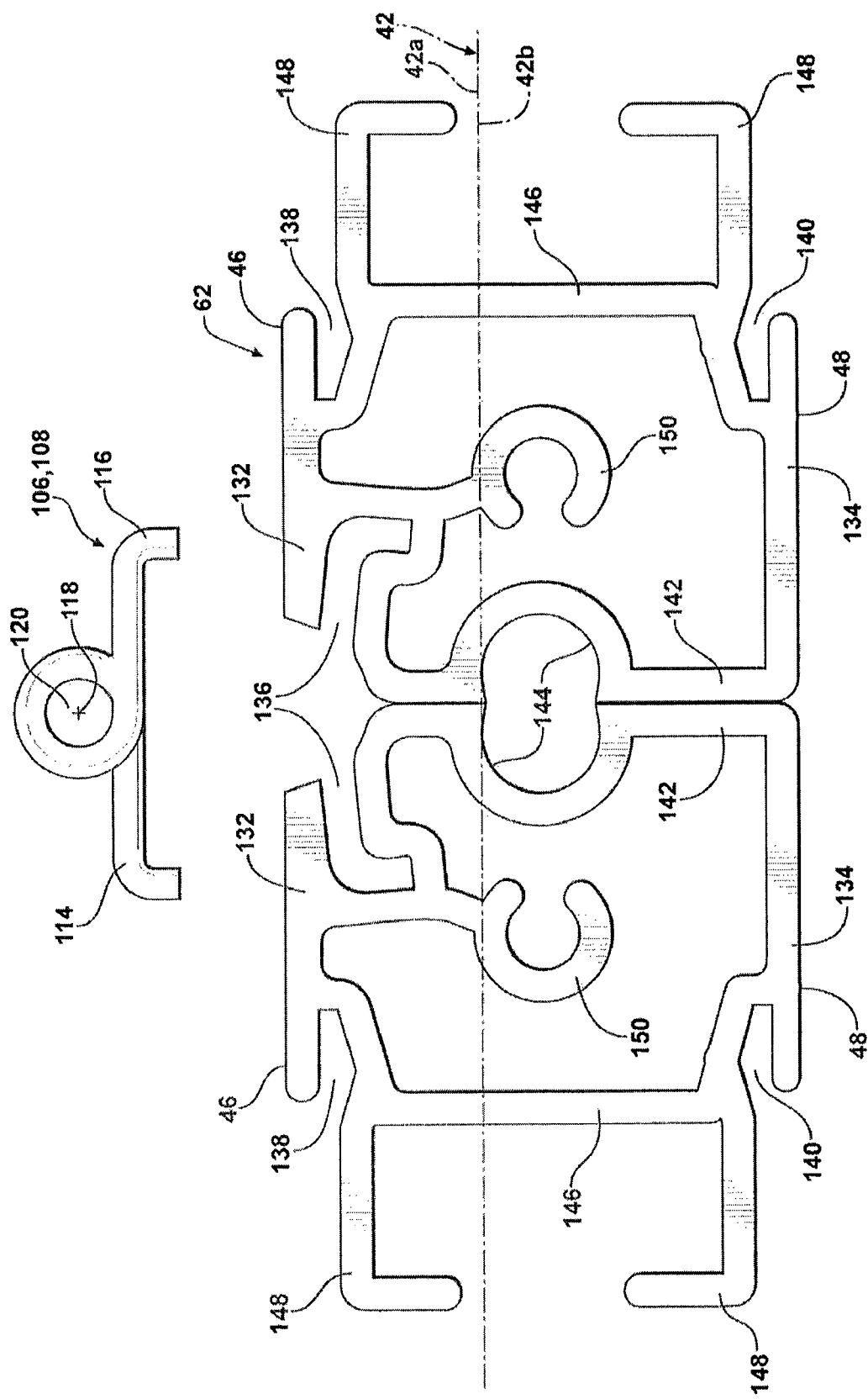
FIG. 10 is an end view of a pair of tonneau cover panel edge rails and a first hinge to be assembled thereto, according to the first embodiment.
Figure 12:
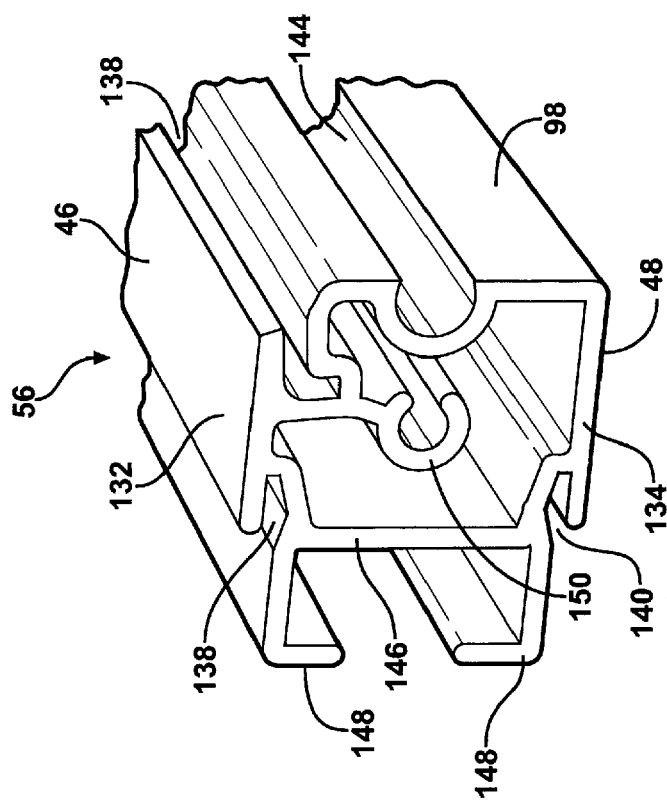
FIG. 12 is a fragmented perspective view of the edge rail of FIG. 11.
Figure 11:
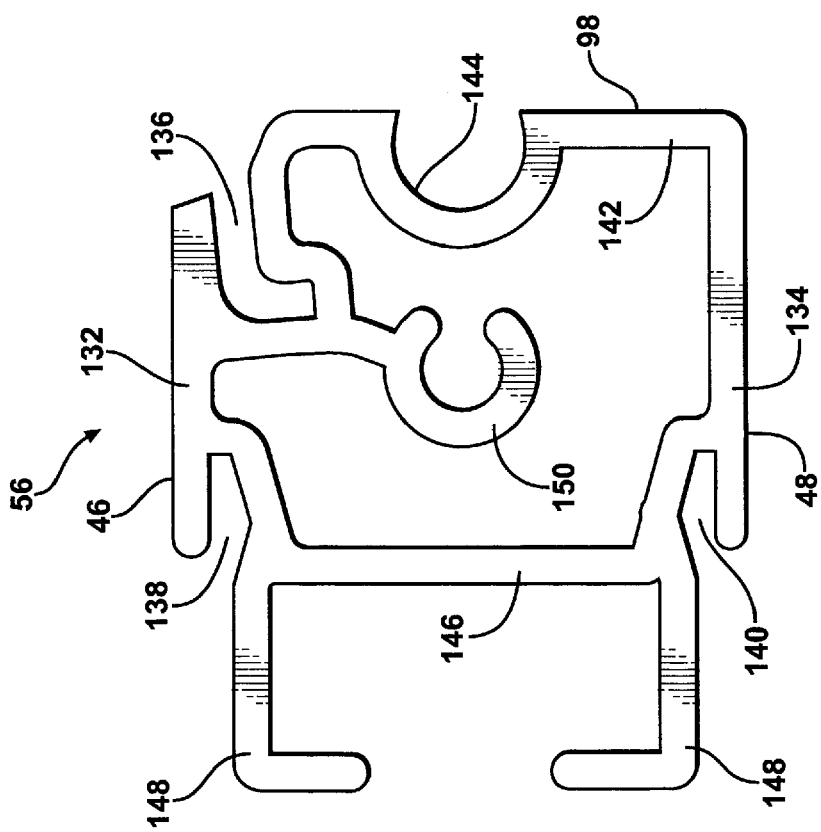
FIG. 11 is an end view of one of the edge rails shown in FIG. 10.

In accordance with the first embodiment, referring now to FIGS. 6-9, a coupling member 130 joins the frame members 30 within each panel 26. Further, as shown in FIGS. 10-12, panel edge rail 56 of first panel 34 and panel edge rail 62 of second panel 36 each includes a top segment 132 and a bottom segment 134 spaced and substantially parallel to each other. The top segments 132 each define a first channel 136 for accepting the first and second hinge portions 114, 116 of first hinge assembly 108. Each first channel 136 has a substantially L-shaped configuration complementing the configuration of hinge portions 114, 116 for securing the first hinge assembly 108 to each of the panel edge rails 56, 62. Each top segment 132 further defines a first recess 138 opposing the first channel 136 for accepting one of the sheet members 28. The bottom segment 134 defines a second recess 140 spaced from and below the first recess 138 for accepting another one of the sheet members 28.

Additionally, each of the panel edge rails 56, 62 includes a sealing wall 142 disposed between the top segment 132 and the bottom segment 134. The sealing wall 142 defines a first arcuate groove 144 substantially parallel to the top segment 132 and the bottom segment 134 for accepting a sealing member 102. Panel edge rails 56, 62 further include a panel wall 146 disposed between the top segment 132 and the bottom segment 134 and opposing the sealing wall 142. A pair of legs 148 extends from the panel wall 146 and forms a generally C-shaped configuration with the panel wall 146 for accepting the coupling member 130. Additionally, panel edge rails 56, 62 define a first boss 150 between the top segment 132, the bottom segment 134, the sealing wall 142, and the panel wall 146 for accepting a fastener (not shown).

Figure 13:
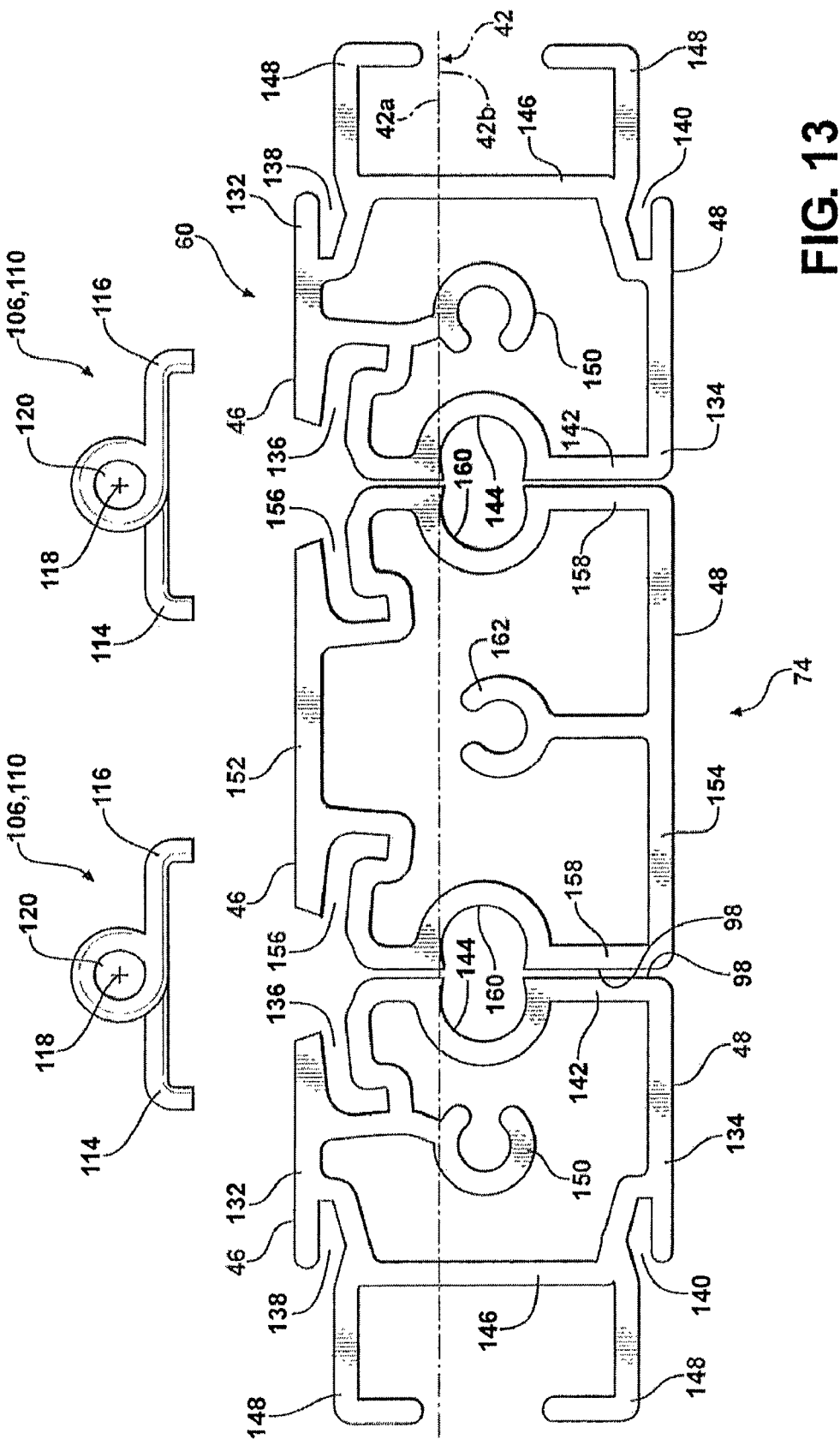
FIG. 13 is an end view of a pair of tonneau cover panel edge rails and a spacer rail disposed therebetween, and a second and third hinge to be assembled thereto, according to the first embodiment.
Figure 15:
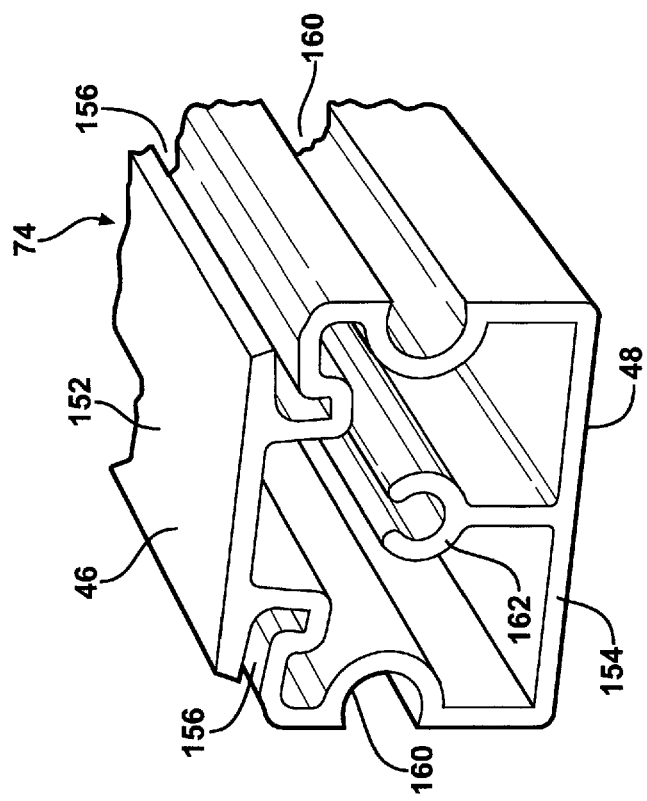
FIG. 15 is a fragmented perspective view of the spacer rail of FIG. 14.
Figure 14:
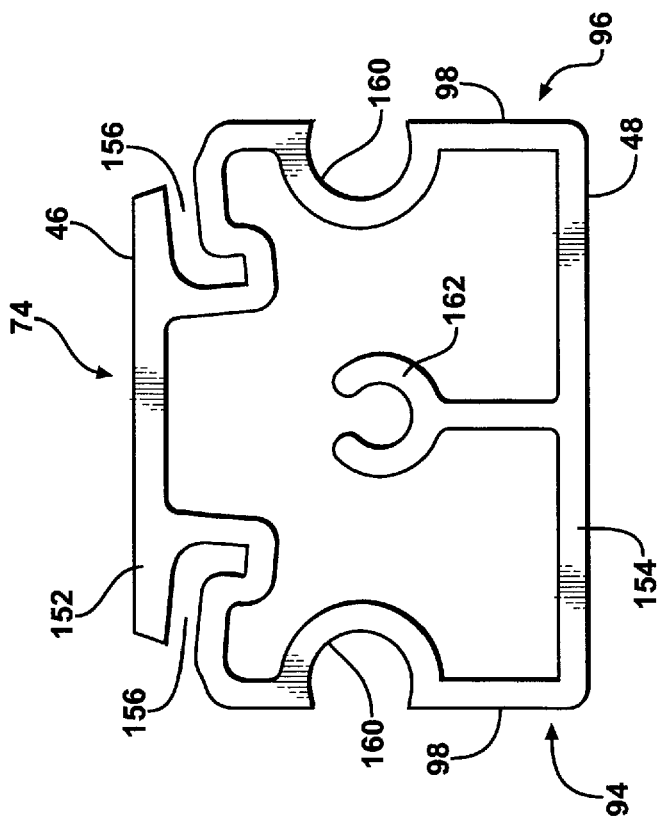
FIG. 14 is an end view of the spacer rail shown in FIG. 13.
Figure 25:
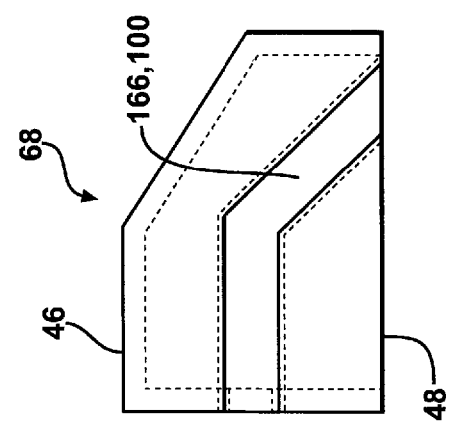
FIG. 25 is an edge-on view of an alternative design of a tonneau cover spacer rail end cap design according to the first embodiment.
Figure 24:
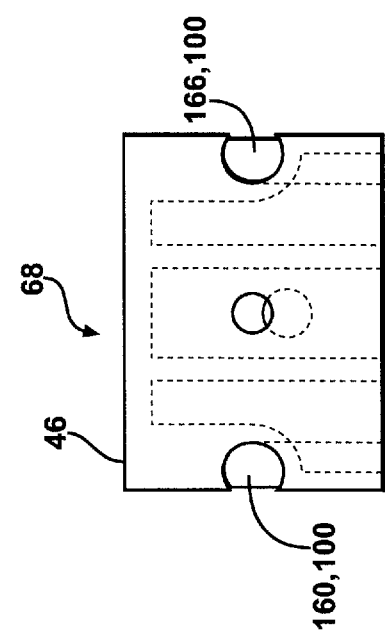
FIG. 24 is an end view of the end cap of FIG. 21.
Figure 23:
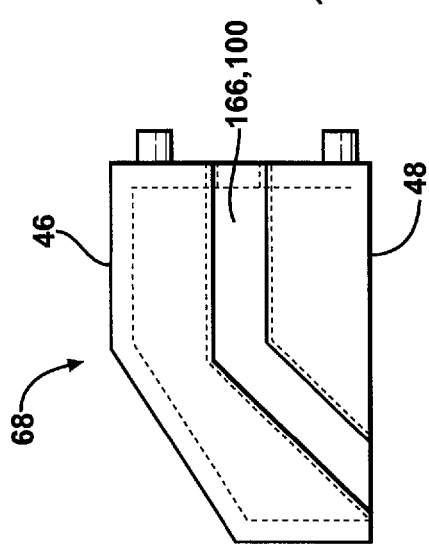
FIG. 23 is an edge-on view of the end cap of FIG. 21.
Figure 27:
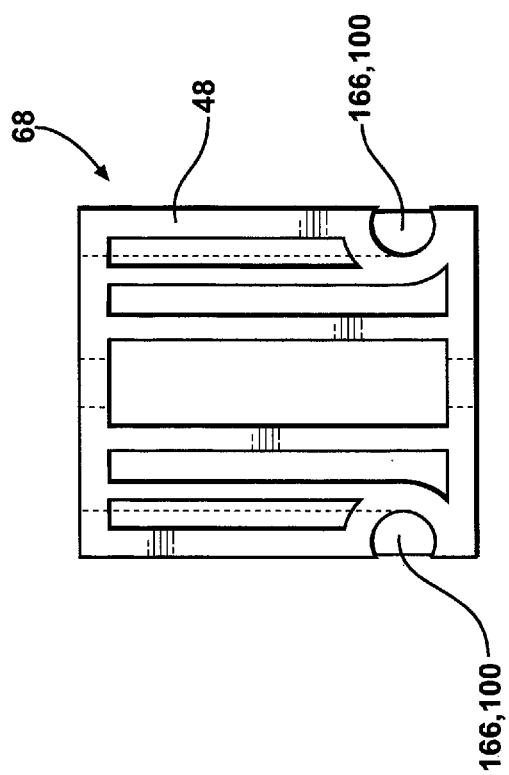
FIG. 27 is a bottom view of the end cap of FIG. 25.
Figure 26:
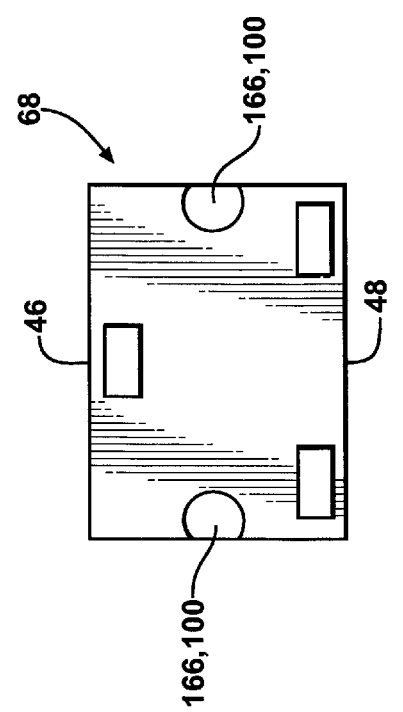
FIG. 26 is an end view of the end cap of FIG. 25.
Figure 29:
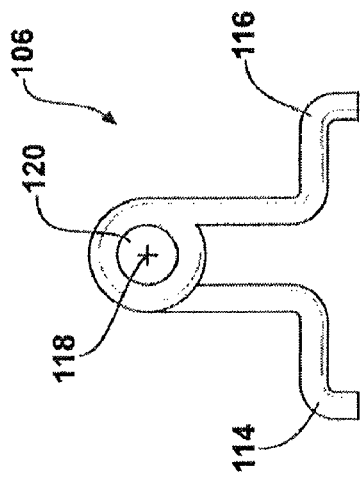
FIG. 29 is an end view of an alternative design of a tonneau cover hinge according to the first embodiment.

Referring to FIGS. 13-15, spacer rail 74 has a top segment 152 and a bottom segment 154 spaced from and substantially parallel to each other. The top segment 152 defines a pair of second channels 156 in a mirrored relationship with one another. Each of the second channels 156 are aligned with the first channel 136 on one of panel edge rails 64, 60. Similar to the first channel 136, each of the second channels 156 is substantially L-shaped complementing the first and second portion 114, 116 of second and third hinge assemblies 110, 112 for securing the hinge assemblies to panel edge rails 64, 60 and spacer rail 74, and coupling the panel edge and spacer rails together.

Spacer rail 74 further includes a pair of side walls 158 disposed between the top segment 152 and the bottom segment 154. Each of the side walls 158 defines a second arcuate groove 160 for accepting a sealing member 102. Each of the second arcuate grooves 160 aligns with the first arcuate groove 144 for inhibiting fluid communication between sealing faces 98. A second boss 162 is defined by the spacer rail 74 between the top segment 152, the bottom segment 154, and the side walls 158 for accepting a fastener.

Referring to FIGS. 16-27, a plurality of panel edge corner members 76, 78 and end caps 68 are disposed on each of the panel edge rails 56, 60, 62, 64 and the spacer rail 74 as described above, for stopping the hinge assemblies 106 from sliding out of channels 136, 156. The corner members 76, 78 each define a third arcuate groove 164 that aligns with the first arcuate groove 144 defined by each of the panel edge rails 56, 60, 62, 64 to create a continuous arcuate channel 100 which extends across the width of the tonneau cover 20. The end caps 68 define a pair of fourth arcuate grooves 166 located opposite each other for aligning with the second arcuate grooves 160 defined by the spacer rail 74. The third arcuate grooves 164 and the fourth arcuate grooves 166 each accept the sealing member 102 for inhibiting fluid communication between sealing faces 98 when the tonneau cover 20 is in an unfolded position. Fasteners are used to secure the corner members 76, 78 to the first boss 150 defined by each panel edge rail 56, 60, 62, 64 of the first bodies 44, and end caps 68 to the second boss 162 defined by the spacer rail 74.

Figure 31A:
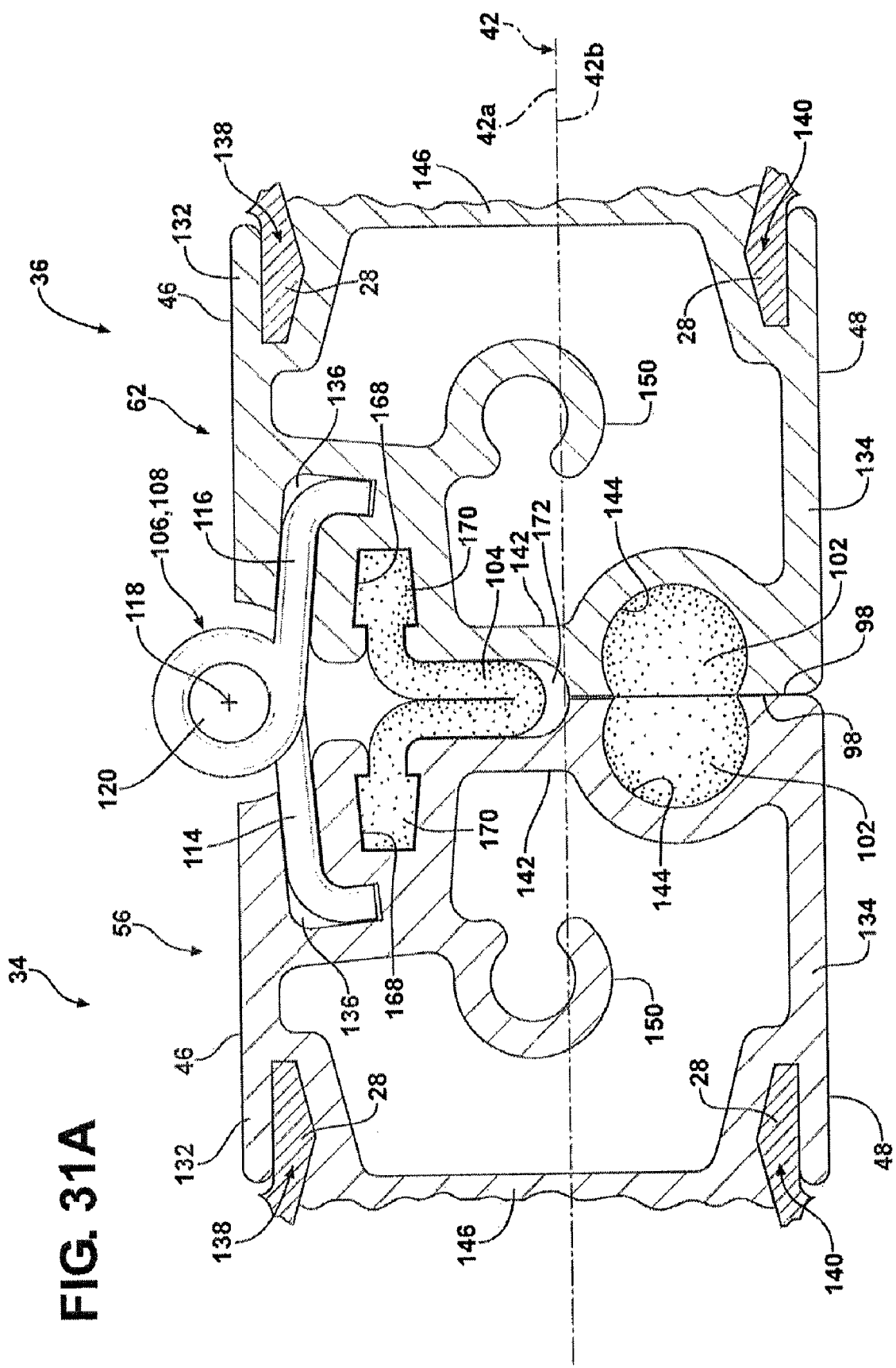
FIG. 31A is a fragmented, sectional end view of a connected pair of tonneau cover panel edge rails and their hinge and seals, according to a second embodiment.

A second embodiment tonneau cover 20 is similar to the first embodiment, but includes a modified panel edge rail cross section wherein sealing wall 142 includes laterally-extending shouldered channel 168 in which is disposed an elongate, cooperatingly-shouldered edge portion 170 of a substantially flat seal member 104, as shown in FIG. 31A. Seal 104 may be an extruded rubber or other polymer. Seal 104 is flexible and impervious to water, and configured to be affixed, though the cooperating shoulders of channels 168 and edge portions 170, to the adjacent panel edge rails 56 and 62, and extend between their sealing faces 98. When tonneau cover 20 is unfolded, the material of seal 104 disposed between its opposed edge portions 170 folds over itself, away from pivot axis 118 of first hinge assembly 108. The doubled seal thickness when seal 104 is so folded is accommodated in a recess or pocket 172 formed by the superposed sealing faces 98. When tonneau cover 20 is folded, with first surface 46 of first panel 34 adjacently superposing first surface 46 of second panel 36, seal 104 remains connected to the panel edge rails 56, 62, and extends over pivot axis 118 of first hinge assembly 108. First and second panel edge corner members 76, 78 affixed to the opposed ends 80, 82 of the panel edge rails 56, 62 close the axial ends of channels 136 and 168 and prevent first hinge assembly 108 and seal 104 from axially sliding laterally out of position.

Figure 31B:
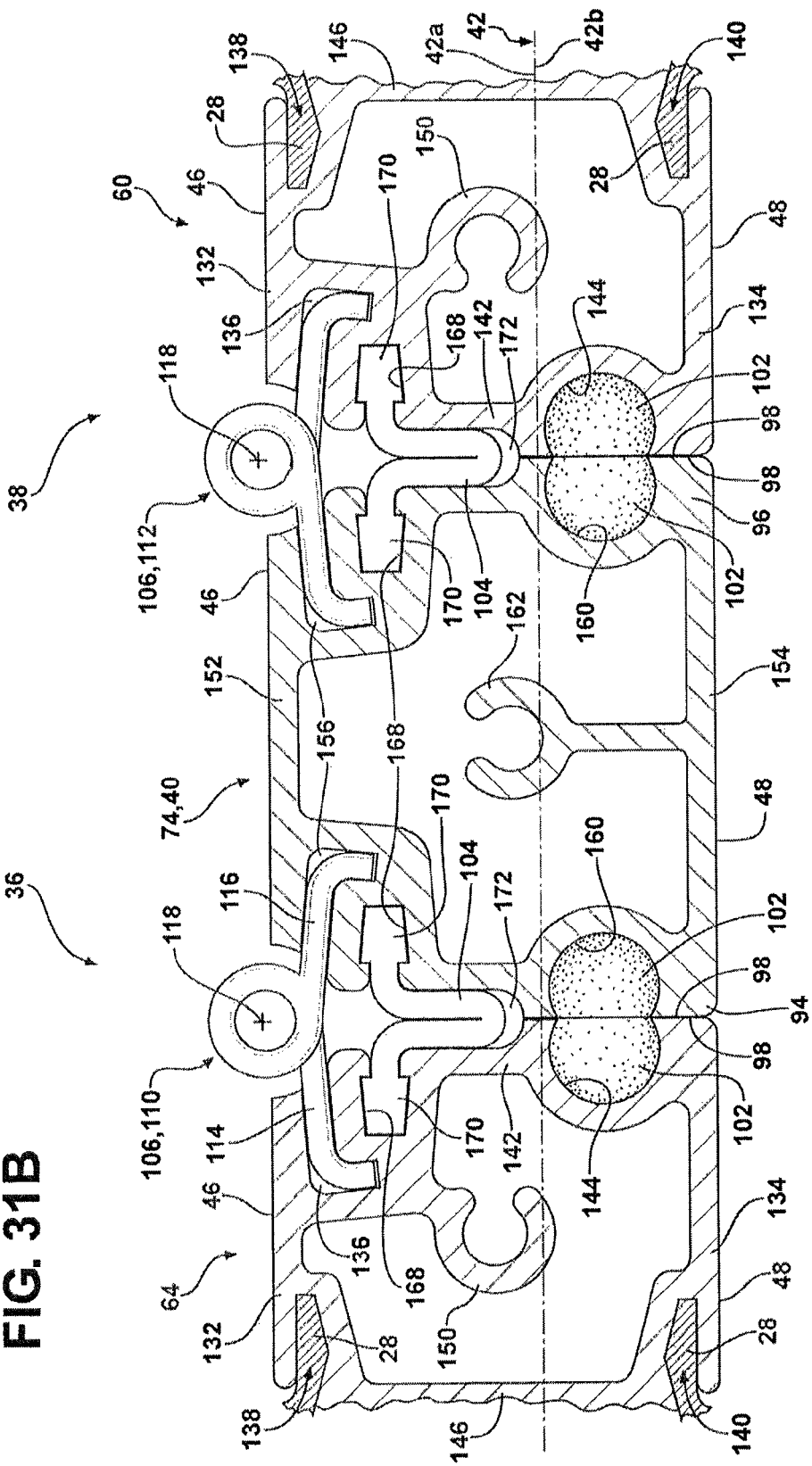
FIG. 31B is a fragmented, sectional end view of a pair of tonneau cover panel edge rails and a spacer rail, and their hinges and seals, according to the second embodiment.
Figure 34:
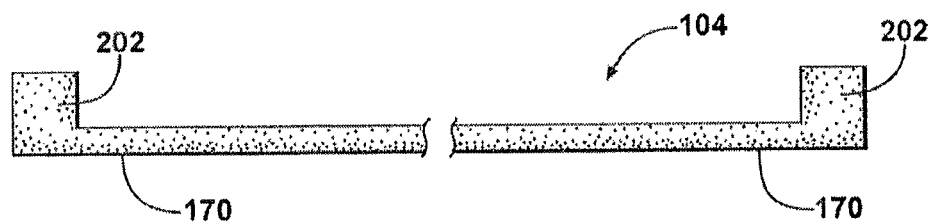
FIG. 34 is a fragmented end view of the seal shown in FIG. 33.
Figure 35:
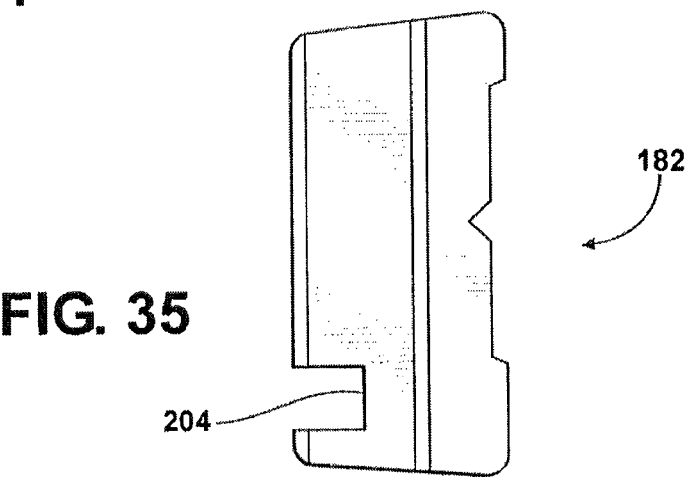
FIG. 35 is an end view of the clamp bar shown in FIG. 33.
Figure 36:
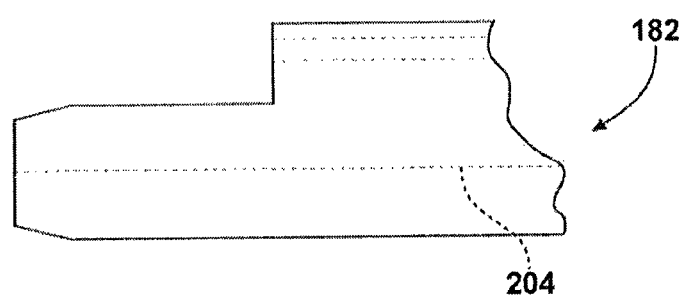
FIG. 36 is a fragmented side view of the clamp bar of FIG. 35.
Figure 37:
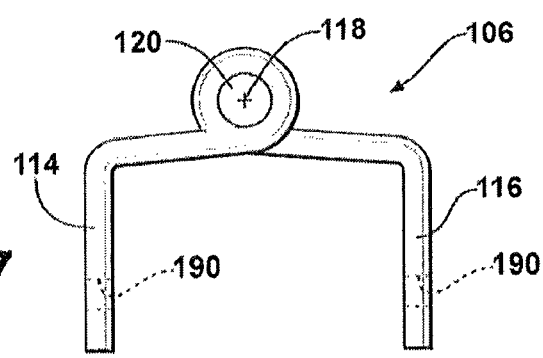
FIG. 37 is an end view of the hinge shown in FIG. 33.
Figure 46:
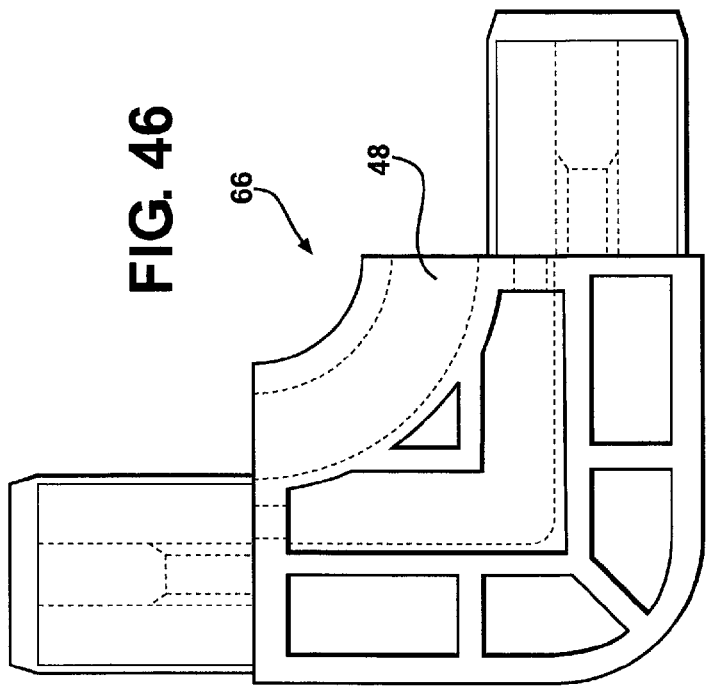
FIG. 46 is a bottom view of the cab-end panel corner member of FIG. 45.
Figure 45:
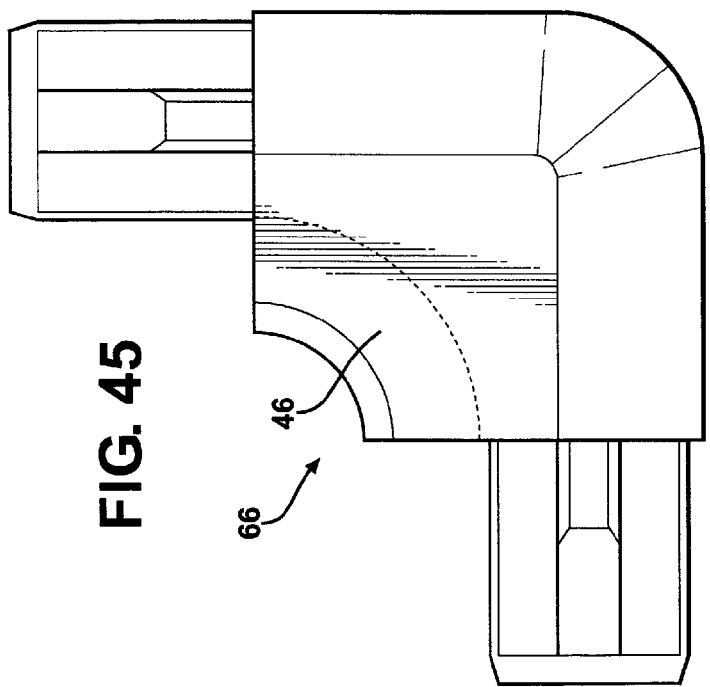
FIG. 45 is a top view of a tonneau cover cab-end panel corner member according to the fourth embodiment.
Figure 47:
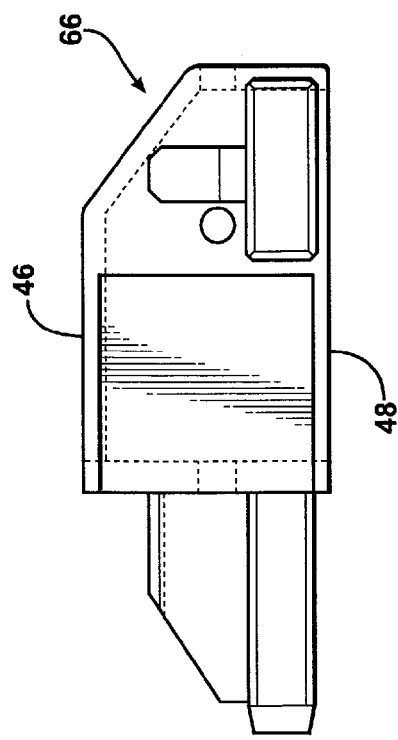
FIG. 47 is a side view of the cab-end panel corner member of FIG. 45.
Figure 49:
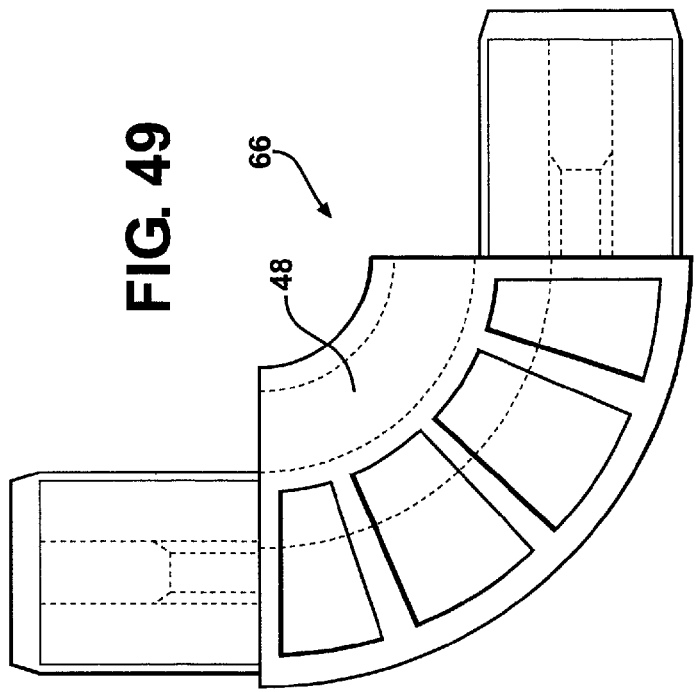
FIG. 49 is a bottom view of the tailgate-end panel corner member of FIG. 48.
Figure 48:
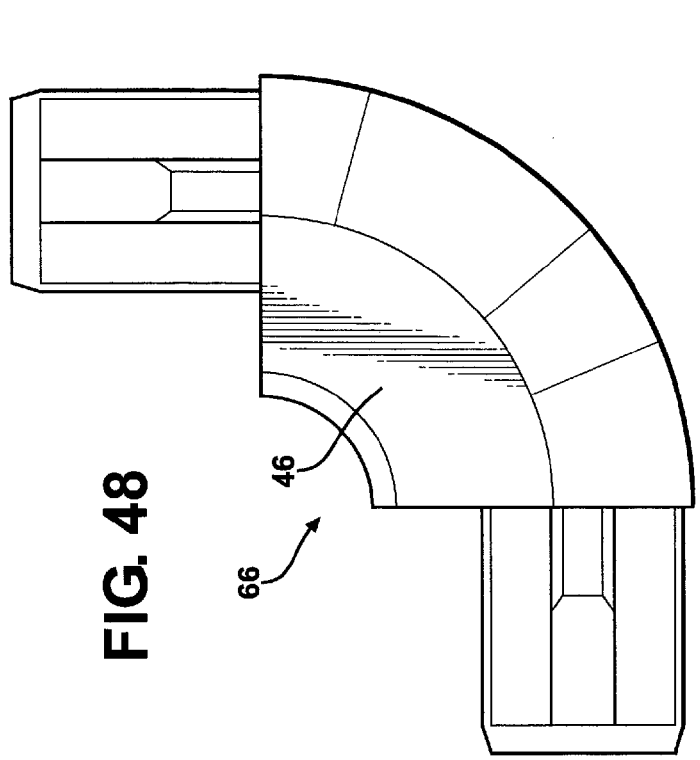
FIG. 48 is a top view of a tonneau cover tailgate-end panel corner member according to the fourth embodiment.
Figure 50:
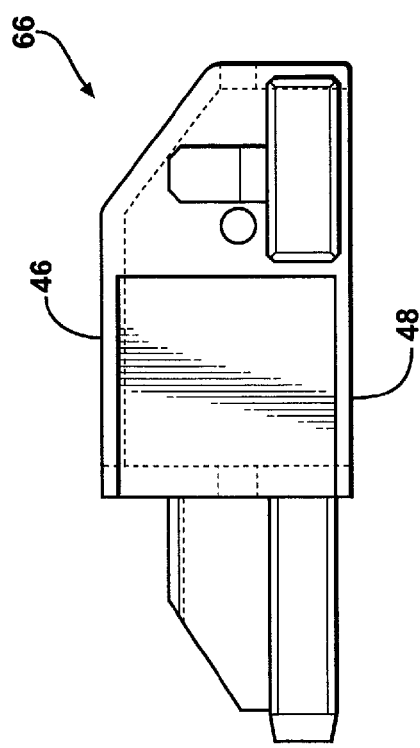
FIG. 50 is a side view of the tailgate-end panel corner member of FIG. 48.

Similarly, the second embodiment of tonneau cover 20 provides a seal 104 between each of second panel edge rail 64 of center panel 36 and the rearward portion 94 of spacer member 40, and between each of panel edge rail 60 of front panel 38 and the forward portion 96 of spacer member, as shown in FIG. 31B. When tonneau cover 20 is unfolded, the material of each respective seal 104 disposed between its opposed edge portions 170 folds over itself, away from pivot axes 118 of second hinge assembly 110 and third hinge assembly 112. The doubled seal thickness when seal each 104 is so folded is accommodated in a recess or pocket 172 formed by the superposed sealing faces 98. When tonneau cover 20 is folded, with second surface 48 of first panel 34 adjacently superposing first surface 46 of third panel 38, seals 104 remain connected to the spacer rail 74 and the respective panel edge rails 64, 60, and extend over the pivot axis 118 of the respective second and third hinge assembly 110, 112. First and second panel edge corner members 76, 78 affixed to the opposed ends 80, 82 of the panel edge rails 64, 60, and end caps 68 affixed to the ends 70, 72 of spacer rail 74, close the axial ends of channels 136, 156 and 168 and prevent second the third hinge assemblies 110, 112 and seals 104 from axially sliding laterally out of position.

A third embodiment tonneau cover 20 is similar to the second embodiment, but includes a modified panel edge rail cross section wherein sealing wall 142 includes laterally-extending double-bottomed channel 180 in which an elongate edge portion 170 of a substantially flat seal member 104 and a clamp bar 182 are disposed and secured with a plurality of headed fasteners 184 extending therethrough and threaded into holes 186 in sealing wall 142, as shown in FIG. 32A. Clamp bar 182 and seal edge portions 170 are provided with a plurality of apertures 188, 190 that are distributed laterally along their axial lengths. Apertures 188, 190 are aligned with the plurality of holes 186 located in shallower bottom 192 of double bottomed channel 180. Seal edge portions 170 are compressed between sealing wall 142 and clamp bar 182 within the shallower bottomed portion of channel 180, whereby seal 104 is further secured to the panel edge rails and/or the spacer rail. Deeper bottom 194 of double bottomed channel 180 and clamp bar 182 form a channel 196 in which the first and second hinge portions 114, 116 are disposed. Portions of seal 104 are captured between the hinge portions 114, 116 and the clamp bar 182.

As in the second embodiment, seal 104 according to the third embodiment is flexible and impervious to water, and may be made of rubber. When tonneau cover 20 is unfolded, the material of seal 104 disposed between its opposed edge portions 170 folds over itself, away from pivot axis 118 of first hinge assembly 108. The doubled seal thickness when seal 104 is so folded is accommodated in a recess or pocket 172 formed between clamp bars 182 and the countersunk heads of fasteners 184. When tonneau cover 20 is folded, with first surface 46 of first panel 34 adjacently superposing first surface 46 of second panel 36, seal 104 remains connected to the panel edge rails 56, 62, and extends over pivot axis 118 of first hinge assembly 108. First and second panel edge corner members 76, 78 affixed to the opposed ends 80, 82 of the panel edge rails 56, 62 close the axial ends of channels 196 and prevent hinge assembly 108 from axially sliding laterally out of position.

Similarly, the third embodiment of tonneau cover 20 provides a seal 104 between each of second panel edge rail 64 of center panel 36 and the rearward portion 94 of spacer member 40, and between each of panel edge rail 60 of front panel 38 and the forward portion 96 of spacer member, as shown in FIG. 32B. When tonneau cover 20 is unfolded, the material of each respective seal 104 disposed between its opposed edge portions 170 folds over itself, away from pivot axes 118 of second hinge assembly 110 and third hinge assembly 112. The doubled seal thickness when seal each 104 is so folded is accommodated in a recess or pocket 172 formed by the superposed faces of clamp bars 182 and the countersunk heads of fasteners 184. When tonneau cover 20 is folded, with second surface 48 of first panel 34 adjacently superposing first surface 46 of third panel 38, seals 104 remain connected to the spacer rail 74 and the respective panel edge rails 64, 60, and extend over the pivot axis 118 of the respective second and third hinge assembly 110, 112. First and second panel edge corner members 76, 78 affixed to the opposed ends 80, 82 of the panel edge rails 64, 60, and end caps 68 affixed to the ends 70, 72 of spacer rail 74, close the axial ends of channels 196 and prevent hinge assemblies 110, 112 from axially sliding laterally out of position.

A fourth embodiment tonneau cover 20 is similar to the third embodiment, but includes a modified panel edge rail cross section wherein deeper portion 194 of double bottomed channel 180 is widened, with holes 186 in sealing wall 142 that receive headed fasteners 184 located in the deeper bottomed portion 194 of channel 180, as shown in FIG. 33. Channel 180 is also provided with laterally-extending ridge 200 raised from the shoulder between shallower portion 192 and the deeper portion 194 thereof. Each elongate edge portion 170 of substantially flat seal 104 includes an integral wall 202 of rectangular cross-section extending perpendicularly from one side thereof. Each integral wall 202 of the respective seal edge portions 170 is received in a cooperating laterally-extending groove 204 in clamp bar 182. Groove 204 is aligned with ridge 200, such that when fasteners 184 of a clamp bar 182 are tightened, wall portion 202 is compressed by ridge 200 into groove 204, whereby the compressive engagement between ridge 200 and seal 104, and between seal wall 202 and groove 204 serves to better seal against water intrusion into cargo box 22, and better affix seal 201 to each panel edge rail and/or spacer rail 74.

As in the third embodiment, the elongate edge portion 170 of substantially flat seal member 104 and clamp bar 182 are provided with a plurality of apertures 190, 188 that are distributed laterally along their axial lengths. Apertures 188, 190 are aligned with the plurality of holes 186 located in deeper bottom 194 of double bottomed channel 180. In the fourth embodiment, however, first and second portions 114, 116 of each hinge assembly 106, which are disposed in channels 196, are provided with apertures 206 through which fasteners 184 extend, thereby more securely fixing the hinge assemblies 106 to the panel edge rails and/or spacer rail. Seal edge portions 170 are compressed between hinge portion 114, 116 and the respective clamp bar 182 within the deeper bottomed portion of channel 180, whereby seal 104 is more firmly secured to the panel edge rails and/or the spacer rail, as portions of seal 104 are firmly captured between the hinge portions 114, 116 and the clamp bar 182.

As in the second and third embodiments, seal 104 according to the fourth embodiment is flexible and impervious to water, and may be made of extruded rubber. Here, too, when tonneau cover 20 according to the fourth embodiment is unfolded, the material of seal 104 disposed between its opposed edge portions 170 folds over itself, away from pivot axis 118 of each hinge assembly 106. The doubled seal thickness when seal 104 is so folded is accommodated in the recess or pocket 172 formed between clamp bars 182 and the countersunk heads of fasteners 184. Here, too, when tonneau cover 20 is folded, with first surface 46 of first panel 34 adjacently superposing first surface 46 of second panel 36, seal 104 remains connected to the panel edge rails 56, 62, and extends over pivot axis 118 of first hinge assembly 108. First and second panel edge corner members 76, 78 affixed to the opposed ends 80, 82 of the panel edge rails 56, 62 close the axial ends of channels 196, but do not serve to prevent seal 104 or hinge assembly 108, which are secured with fasteners 184, from axially sliding laterally out of position.

Figure 51:
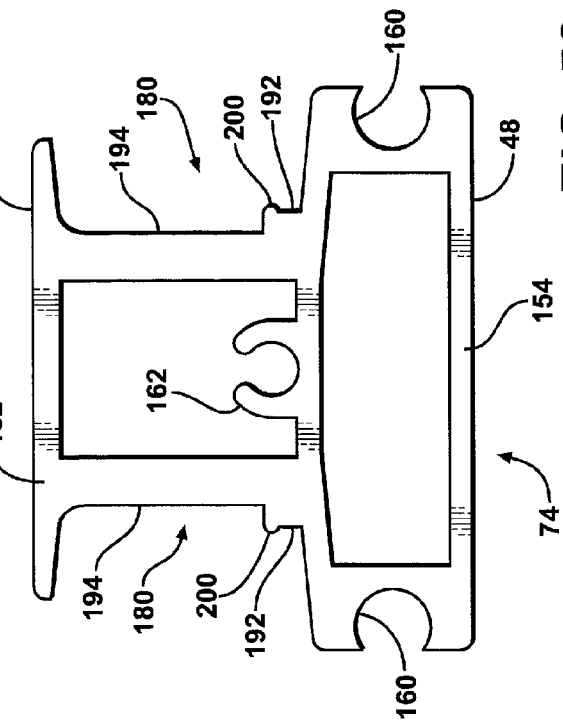
FIG. 51 is an end view of a tonneau cover panel edge rail according to the fourth embodiment.
Figure 52:
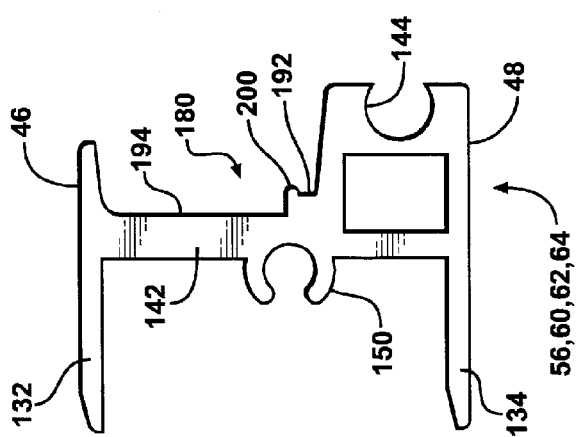
FIG. 52 is an end view of a tonneau cover spacer rail according to the fourth embodiment.
Figure 53:
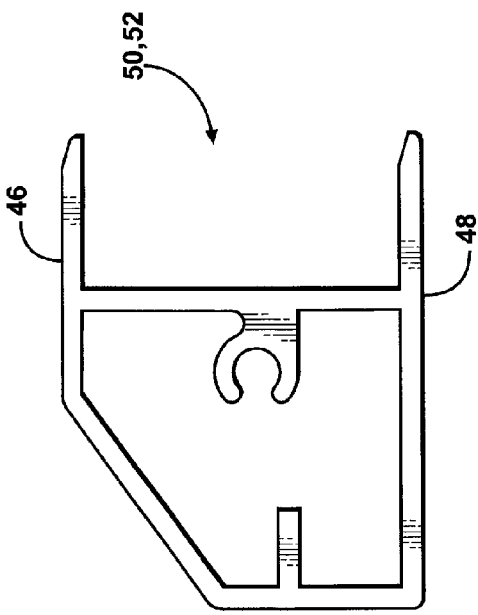
FIG. 53 is an end view of a tonneau cover panel side rail according to the fourth embodiment.

As will be understood from the foregoing, and from additional FIGS. 51 and 52 depicting panel edge rails 56, 60, 62, 64 and spacer rail 74 according to the fourth embodiment, the fourth embodiment of tonneau cover 20 provides a seal 104 between each of second panel edge rail 64 of center panel 36 and the rearward portion 94 of spacer member 40, and between each of panel edge rail 60 of front panel 38 and the forward portion 96 of spacer member. When tonneau cover 20 is unfolded, the material of each respective seal 104 disposed between its opposed edge portions 170 folds over itself, away from pivot axes 118 of second hinge assembly 110 and third hinge assembly 112. The doubled seal thickness when seal each 104 is so folded is accommodated in a recess or pocket 172 formed by the superposed faces of clamp bars 182 and the countersunk heads of fasteners 184. When tonneau cover 20 is folded, with second surface 48 of first panel 34 adjacently superposing first surface 46 of third panel 38, seals 104 remain connected to the spacer rail 74 and the respective panel edge rails 64, 60, and extend over the pivot axis 118 of the respective second and third hinge assembly 110, 112. First and second panel edge corner members 76, 78 affixed to the opposed ends 80, 82 of the panel edge rails 64, 60, and end caps 68 affixed to the ends 70, 72 of spacer rail 74, close the axial ends of channels 196, but do not serve to prevent hinge assemblies 110, 112 or seal 104, which are secured with fasteners 184, from axially sliding laterally out of position.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A folding tonneau cover comprising:
 a first panel having an exterior side;
 a second panel having an exterior side aligning with said exterior side of said first panel to define an exterior plane and a gap disposed between said first and second panels when said tonneau cover is in an unfolded position, and said exterior sides facing one another when said tonneau cover is in a folded position;
 a hinge mounted to each of said first and second panels with said hinge defining a pivot axis for allowing pivotal movement of said first and second panels relative to one another between said folded and unfolded positions and said hinge at least partially disposed within said gap when said tonneau cover is in said unfolded position; and
 a seal coupled to each of said first and second panels;
 wherein said hinge is at least partially disposed below said exterior plane and said seal is disposed entirely below said exterior plane and said pivot axis when said tonneau cover is in said unfolded position for inhibiting intrusion of debris between said first and second panels and wherein said seal remains coupled to each of said first and second panels when said tonneau cover is in said folded position.

2. The folding tonneau cover of claim 1, wherein said seal is configured as an elongate, substantially flat member having opposed edges each of which are respectively coupled to said first and second panels.

3. The folding tonneau cover of claim 2, further comprising a plurality of screws, each of said screws having a head and extending through said seal and said hinge and into one of said first and second panels.

4. The folding tonneau cover of claim 3, further comprising a clamp bar disposed between said head of each said screws and respective said seal through which said screws extend.

5. The folding tonneau cover of claim 1, wherein said seal is further defined as a primary seal, and further including at least one secondary seal, with said primary seal coupled to said first and second panels and said at least one said secondary seal coupled to one of said first and second panels.

6. The folding tonneau cover of claim 5, wherein each of said first and second panels include a panel edge rail with both of said panel edge rails defining an elongate channel for accepting said secondary seal therein such that said secondary seals compressingly abut each other when said tonneau cover is in said unfolded position for inhibiting intrusion of debris between said first and second panels and said secondary seals are uncompressed when said tonneau cover is in said folded position.

7. The folding tonneau cover of claim 5, wherein each of said first and second panels include a panel edge rail with each of said panel edge rails defining an elongate channel for accepting one of said secondary seals within each of said elongate channels.

8. The folding tonneau cover of claim 7, wherein, when said cover is in said unfolded position, said elongate channels of said panel edge rails of said first and second panels face each other such that said secondary seals compressively abut each other.

9. The folding tonneau cover of claim 1, further including a third panel having an exterior side aligning with said exterior sides of said first and second panels to further define said exterior plane when said tonneau cover is in said unfolded position.

10. The folding tonneau cover of claim 9, further including a spacer disposed between said second panel and said third panel with said spacer having an exterior side aligning with said exterior sides of said first, second, and third panels to further define said exterior plane and define a second gap disposed between said second panel and said spacer and a third gap disposed between said third panel and said spacer when said tonneau cover is in said unfolded position.

11. The folding tonneau cover of claim 10 wherein, when said cover is in said folded portion, said first panel is disposed between said second and third panels.

12. The folding tonneau cover of claim 10, wherein said hinge is further defined as a first hinge and each of said first, second, and third hinges is an elongate piano hinge.

13. The folding tonneau cover of claim 10, further including a second primary seal coupled to each of said second panel and said spacer and disposed entirely below said exterior plane and said second pivot axis when said tonneau cover is in said unfolded position for inhibiting intrusion of debris between said second panel and said spacer.

14. The folding tonneau cover of claim 10, further including a third primary seal coupled to each of said third panel and said spacer and disposed entirely below said exterior plane and said third pivot axis when said tonneau cover is in said unfolded position for inhibiting intrusion of debris between said third panel and said spacer.

15. The folding tonneau cover of claim 10, wherein said spacer includes a pair of edge rails spaced from one another and said second panel includes a second panel edge rail disposed adjacent one of said edge rails of said spacer and said third panel includes a panel edge rail disposed adjacent the other said edge rail of said spacer with each of said edge rails defining an elongate channel for accepting one of said secondary seal therein.

16. The folding tonneau cover of claim 10, further including a second hinge disposed within said gap and mounted to each of said second panel and said spacer with said second hinge defining a second pivot axis for allowing pivotal movement of said second panel and said spacer relative to one another between said folded and unfolded positions wherein said second hinge is at least partially disposed below said exterior plane.

17. The folding tonneau cover of claim 16, further including a third hinge disposed within said gap and mounted to each of said third panel and said spacer with said third hinge defining a third pivot axis for allowing pivotal movement of said third panel and said spacer relative to one another between said folded and unfolded positions wherein said third hinge is at least partially disposed below said exterior plane.

18. A folding tonneau cover comprising:
a first panel having an exterior side;
a second panel having an exterior side aligning with said exterior side of said first panel to define an exterior plane and a gap disposed between said first and second panels when said tonneau cover is in an unfolded position, and said exterior sides facing one another when said tonneau cover is in a folded position;
a hinge mounted to each of said first and second panels with said hinge defining a pivot axis for allowing pivotal movement of said first and second panels relative to one another between said folded and unfolded positions and said hinge at least partially disposed within said gap when said tonneau cover is in said unfolded position; and
a first seal coupled to said first panel;
a second seal coupled to said second panel;
wherein said hinge is at least partially disposed below said exterior plane and said first and second seals are disposed entirely below said exterior plane and said pivot axis and wherein said first seal abuts said second seal when said tonneau cover is in said unfolded position for inhibiting intrusion of debris between said first and second panels.

19. The folding tonneau cover of claim 18, wherein said first and second seals are further defined as secondary seals, and further including at least one primary seal, with said secondary seals coupled to said first and second panels respectively and said at least one primary seal coupled to both of said first and second panels.

20. The folding tonneau cover of claim 18, wherein each of said first and second panels include a panel edge rail with each of said panel edge rails defining an elongate channel for accepting one of said secondary seals within each of said elongate channels and when said tonneau cover is in said unfolded position said elongate channels face one another and said secondary seals compressively abut each other for inhibiting intrusion of debris between said first and second panels and said secondary seals are uncompressed when said tonneau cover is in said folded position.

* * * * *